US 8,561,808 B2

(12) United States Patent
van Savooijen et al.

(10) Patent No.: US 8,561,808 B2
(45) Date of Patent: Oct. 22, 2013

(54) FILTER ASSEMBLY

(75) Inventors: Henk van Savooijen, Almelo (NL);
Pieter van Gisbergen, Arnhem (NL);
Richard Theodorus Antonius Arts,
Deest (NL); **Marinus Johannes Berend
van Boven**, Wageningen (NL)

(73) Assignee: Parker Filtration B.V., Arnhem (NL)

( * ) Notice: Subject to any disclaimer, the term of this patent is extended or adjusted under 35 U.S.C. 154(b) by 81 days.

(21) Appl. No.: 12/999,347

(22) PCT Filed: Jun. 22, 2009

(86) PCT No.: PCT/NL2009/000137
§ 371 (c)(1),
(2), (4) Date: Mar. 3, 2011

(87) PCT Pub. No.: WO2009/154445
PCT Pub. Date: Dec. 23, 2009

(65) Prior Publication Data
US 2011/0168613 A1 Jul. 14, 2011

(30) Foreign Application Priority Data

Jun. 20, 2008 (NL) .................................. 2001709
Apr. 20, 2009 (NL) ................. PCT/NL2009/000098

(51) Int. Cl.
| B01D 27/00 | (2006.01) |
| B01D 35/00 | (2006.01) |
| B01D 35/28 | (2006.01) |
| B01D 35/30 | (2006.01) |
| B01D 35/153 | (2006.01) |
| B01D 21/24 | (2006.01) |
| B01D 24/38 | (2006.01) |
| B01D 25/30 | (2006.01) |
| B01D 29/88 | (2006.01) |
| B01D 33/70 | (2006.01) |
| B01D 35/02 | (2006.01) |

(52) U.S. Cl.
USPC ........... 210/437; 210/234; 210/232; 210/418; 210/429; 210/440

(58) Field of Classification Search
USPC ......... 210/133, 232, 234, 418, 429, 430, 431, 210/432, 440, 442, 443, 444
See application file for complete search history.

(56) References Cited

U.S. PATENT DOCUMENTS

| 4,657,040 A | 4/1987 | Torres |
| 6,595,372 B1 * | 7/2003 | Minowa et al. ............... 210/440 |

(Continued)

FOREIGN PATENT DOCUMENTS

| DE | 200 04 431 U1 | 6/2000 |
| DE | 19917567 A1 | 11/2000 |

(Continued)

*Primary Examiner* — Nam Nguyen
*Assistant Examiner* — Clare Perrin
(74) *Attorney, Agent, or Firm* — Hoffmann & Baron, LLP

(57) ABSTRACT

A filter assembly comprises a filter housing (23) into which a filter element is insertable. A core element (38) is provided extending within the housing (23). The filter assembly comprises a coupling assembly (200) that is insertable into the housing (23), the coupling assembly (200) comprising a leaf spring (201) having a span larger than an internal diameter of the filter housing (23), such that when the leaf spring (201) is inserted into the filter housing (23) the outer edge of the leaf spring (201) engages an inner surface of the filter housing (23) and the leaf spring (201) bulges in the direction of insertion of the leaf spring into the housing, preventing removal of the leaf spring, in a direction opposite to the insertion direction, from the filter housing (23), the coupling assembly (200) comprising a connecting part for connecting the core element (38) to the coupling assembly (200).

14 Claims, 14 Drawing Sheets

(56) References Cited

U.S. PATENT DOCUMENTS

| | | |
|---|---|---|
| 6,770,110 B1 | 8/2004 | Seifert et al. |
| 6,818,122 B2 * | 11/2004 | Mouhebaty .......... 210/132 |
| 2001/0035376 A1 | 11/2001 | Dworatzek |
| 2006/0086652 A1 | 4/2006 | Knight |
| 2007/0187316 A1 | 8/2007 | Weinberger et al. |

FOREIGN PATENT DOCUMENTS

| | | |
|---|---|---|
| EP | 0 972 554 A1 | 1/2000 |
| EP | 1 479 427 A1 | 11/2004 |
| GB | 576580 A | 4/1946 |
| JP | 2000 225305 A | 8/2000 |
| WO | 2008/128150 A2 | 10/2008 |

* cited by examiner

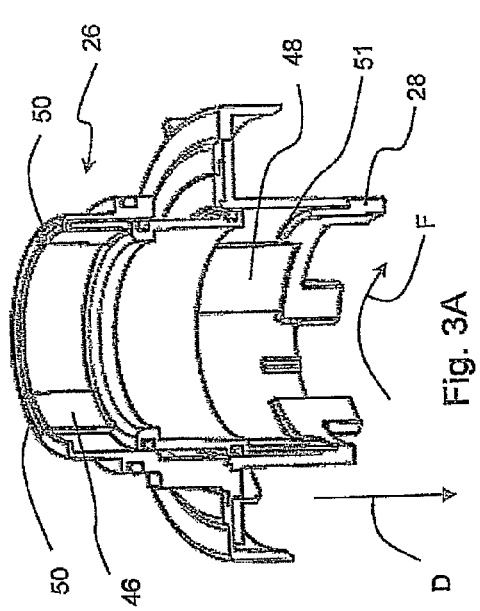
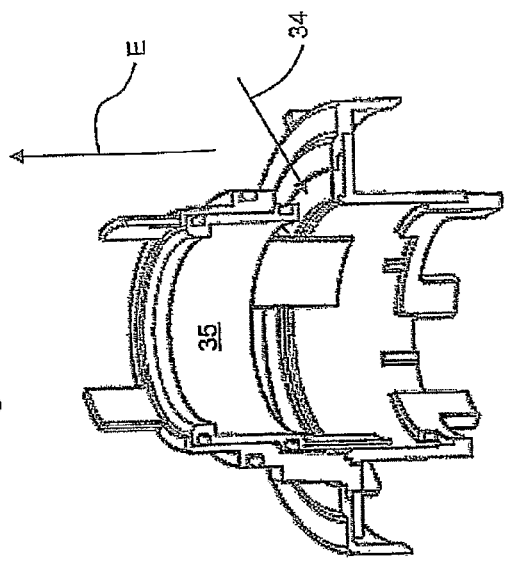
Fig. 3A
Fig. 3B
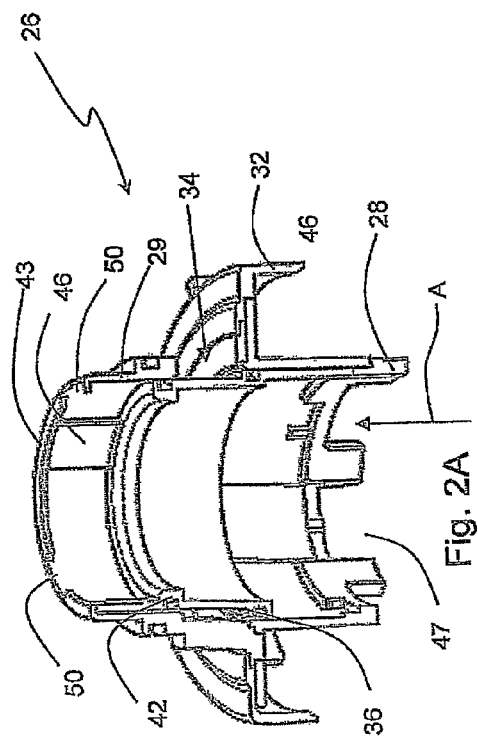
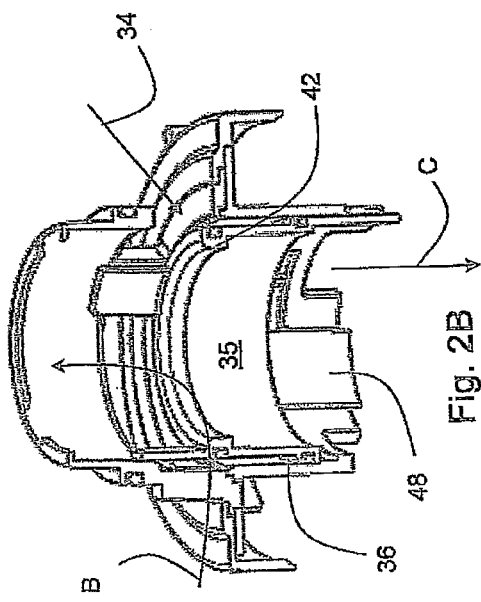
Fig. 2A
Fig. 2B

FILTER ASSEMBLY

CROSS-REFERENCE TO RELATED APPLICATIONS

This application is the National Stage of International Application No. PCT/NL2009/000137, filed Jun. 22, 2009, which claims the benefit of International Application No. PCT/NL2009/000098, filed Apr. 20, 2009, which claims the benefit of Netherlands Application No. 2001709, filed Jun. 20, 2008, the contents of which is incorporated by reference herein.

FIELD OF THE INVENTION

The present invention relates to a filter assembly. In particular the invention relates to a filter assembly for filtering hydraulic fluids and a filter element for use in such a filter assembly.

BACKGROUND OF THE INVENTION

Filter assemblies have for example been employed in a variety of applications including hydraulic systems, fuel systems and engine lubrication systems. Application of filter systems for filtering gaseous media are also known. Such assemblies for example use replaceable filter elements that can be installed on a filter head for filtering fluid flowing between inlet and outlet ports in the filter head. The filter element typically is contained within a filter housing such as a can that can be screwed onto or off of the filter head. In a so-called spin-on filter, the can is discarded along with the filter element. In other arrangements, only the filter element is replaced and the filter housing is reused. During use the filter element may become clogged to the point that is causes a problem in the system, such as inadequate flow to components downstream of the filter, excessive pressure upstream of the filter element, and/or damage to the filter element allowing the accumulated contaminants to flow to components downstream of the filter element. Normally this is avoided by scheduled replacement of the filter element, or after the need of replacement has been brought to the attention of the operator of the system, which may be in the form of an alarm issued by the fluid system for example. It is thus necessary to replace the filter element from time to time.

Filter elements commonly have a wall of a filtration medium and an end cap with an inlet (or outlet) which can be sealed to the head part of the housing to provide a flow path for a fluid stream to be supplied to the interior or space (or to be extracted from the space) within the filter element. The inlet (or outlet) is provided by a port or passage on an end cap of the element. The port may e.g. have an O-ring seal on its external surface which is received in a bore within the housing end cap, in which it is compressed to form a seal. Often, such a filter element has a cylindrical shape. The fluid to be filtered enters the filter assembly via the inlet, the inlet being arranged in such manner that the fluid can distribute along the outer surface of the filter element. The fluid is then forced through the filter element whereby contaminants in the fluid remain captured in the filter element and the filtered fluid is forced to an outlet of the filter assembly. As an alternative, the flow may be in opposite direction; the contaminated fluid entering the filter element axially and then being forced through the filter element thereby flowing substantially radially outward.

Filter assemblies as described can e.g. be applied to filter oil of a lubrication system or an hydraulic system of e.g. a crane. In order to maintain the fluid flowing through the system (i.e. comprising tubing and a filter assembly), a pump is required. This is due to the fact that both the tubing and the filter assembly represent a resistance for the fluid flow. In general, the pump can be driven by an electrical motor or a combustion engine such as diesel engine for example.

In order to gain access to the filter element when it has to be replaced, the head and body parts, if any, of the filter housing can be separated. A concern of known filter assemblies when replacing the filter element is, that some fluid such as for example hydraulic oil or free fluid content in gasses remains in the conduit that is attached to the outlet port of the filter assembly. In case of a filter used for filtering gaseous media, liquid media etcetera, the fluid content could drain out when replacing the filter element. By separating the filter housing from the filter head, this fluid may be spilled, as the filter housing is often still (partly) filled with fluid. Even if the filter housing is drained before removing it from the filter head, some fluid will flow out of the conduit attached to the outlet port due to gravitation. Spilling of fluid, in particular hydraulic fluid, constitutes on the one hand a safety hazard when it is spilled on floors, on the other hand it constitutes an environmental hazard.

In particular filter assemblies used for filtering hydraulic fluids may advantageously be provided with a so-called core element. Such a core element extends along the filter element on that side thereof that is part of the clean part of the fluid system. In other words, the core element is located at the downstream side of the filter element. Due to the nature of the filter element there exists a pressure drop over the filter element. This pressure drop may be substantial, in particular for high-pressure hydraulic systems. The consequence thereof is that also the pressure difference over the filter element may be substantial. Filter elements commonly used in hydraulic systems are not adapted to withstand high pressure differences and will buckle if the pressure difference is too large. The core element provides the required structural strength and is for example made from stainless steel or any other suitable material. In order to reduce costs, the core element is often provided as a separate element of the filter assembly and should normally not be replaced when the filter element is replaced. Hence, when the filter element is replaced the person replacing it must be aware that the core element must be put back in the filter assembly. It has shown in practice that this may easily be forgotten. The core element is than left in the filter element and thrown away with it. In case this is discovered in time, a new core element is placed which increases costs. In case the missing core element is not noticed, the new filter element will collapse with disastrous consequences for the filter assembly. A solution to this concern is proposed in German utility model DE 200 04 431 U, wherein a filter housing is proposed that is provided with a circular wall member in its bottom section extending in longitudinal direction within said filter housing from the bottom part thereof and which can establish a snap coupling with a core element. A concern of this solution is that the filter housing is of a relatively complicated design and thus is relatively expensive, in particular because the filter housing of DE 200 04 431 U has to be made by casting.

OBJECT OF THE INVENTION

The present invention aims to alleviate the above mentions concerns. The present invention aims to address the concern of the omission of placing the core element in the filter assembly and to provide a simple and cost effective solution. Further, the present invention aims to address the concern of unwanted spilling of fluid when separating the filter housing and the filter head when the filter element needs to be replaced.

SUMMARY OF THE INVENTION

According to a first aspect of the present invention a filter assembly is provided that comprises a filter housing into which a filter element is insertable and a filter head attachable to said filter housing. The filter head comprises an inlet port in fluid communication with a first side of the filter element, and an outlet port in fluid communication with a second side of the filter element. The filter assembly further comprises a core element extending within the filter housing and substantially covering the second side of the filter element. The filter assembly further comprises a coupling assembly that is insertable into the filter housing, and comprises a leaf spring having a span larger than an internal diameter of the filter housing, such that when the leaf spring is inserted into the filter housing the outer edge of the leaf spring engages an inner surface of the filter housing and the leaf spring bulges in the direction of insertion of the leaf spring into the filter housing, preventing removal of the leaf spring, in a direction opposite to the insertion direction, from the filter housing. The coupling assembly further comprising a connecting part for connecting the core element to the coupling assembly.

The leaf spring establishes a very strong and secure connection between the coupling assembly and the filter housing. Furthermore, the leaf spring due to its design allows for a very convenient introduction of the coupling assembly in the filter housing which reduces the costs of manufacture and in particular allows for a simpler design of the filter housing, also reducing costs. Further, once inserted in the filter housing, due to its design the leaf spring cannot be easily removed from the filter housing. The further connection that is established between the coupling assembly and the core element has the effect that the core element is in turn attached or connected to the filter housing, so that it remains installed in the filter housing and is not separated from the filter housing when removing the filter element. This solves the concern of known filter assemblies where it is possible to forget to install the core element after the replacement of a filter element. Also the core element cannot be erroneously be thrown away with the filter element.

In an embodiment of the first aspect of the invention the coupling assembly comprises a number of support legs for supporting the coupling assembly at a distance from a bottom part of the filter housing. This ensures that there exists a clearance between the coupling assembly and a bottom part of the filter housing, in which clearance unfiltered material can accumulate without impeding the proper functioning of the filter assembly.

In a further embodiment of the first aspect of the invention the coupling assembly further may comprises an intermediate coupling member that is connected to the leaf spring and comprises the connecting part for connecting the core element to the coupling assembly. This improves manufacturability of the coupling assembly as the intermediate coupling member may now for example be made from a different material as the leaf spring.

In a further embodiment of the first aspect of the invention the filter element may comprise an end cap assembly at a distal end thereof that is closest to the coupling assembly. Said end cap assembly comprises a projection which is accommodated in a slot provided in a peripheral wall of the intermediate coupling member, wherein said wall extends in a longitudinal direction of the filter housing away from the leaf spring. The end cap assembly comprises a circumferential groove for accommodating a seal member and the intermediate coupling member comprises a circumferential sealing surface for sealing against the seal member, and wherein said groove and said sealing surface have a corresponding inclination with respect to the longitudinal direction of the filter housing.

The slot in the peripheral wall of the intermediate coupling member ensures that when the projection is accommodated therein, the filter element is positioned correctly with respect to the intermediate coupling member. The provision of a seal member, such as an O-ring for example, that is arranged in an inclined plane with respect to the longitudinal direction of the filter housing has the advantage that during installation of the filter element in the housing less forces are exerted on the seal member. The fact that the seal member is arranged in an inclined plane requires however that the it must be positioned correctly with respect to the sealing surface in order to establish a proper seal.

In an embodiment of the first aspect of the invention the filter head further comprises a valve assembly arranged in the outlet port, the valve assembly being movable in an axial direction between a first valve assembly position allowing flow through said outlet port and a second valve assembly position blocking flow through said outlet port.

According to a second aspect of the present invention a filter assembly is provided that comprises a filter housing for accommodation in removable manner a filter element, the filter element comprising a filter medium for filtering a fluid flowing from a first side of the filter element, through the filter medium, to a second side of the filter element, a filter head comprising an inlet port in fluid communication with the first side of the filter element, an outlet port in fluid communication with second side of the filter element. The filter housing and filter head are mounted to each other in removable manner. The filter head further comprises a valve assembly arranged in the outlet port, the valve assembly being movable in an axial direction between a first valve assembly position allowing flow through said outlet port and a second valve assembly position blocking flow through said outlet port.

By providing a valve assembly in the filter head which valve assembly functions like a non-return valve which can close and open and thus block respectively allow fluid to flow through the outlet port in the filter head, any fluid remaining in the filter head and/or in a conduit attached to the outlet port can blocked from flowing out of the filter head. Hence, separating the filter housing from the filter head can be done without the risk of spilling fluid which is present downstream of the filter as the flow path will be closed by the non-return valve assembly. Further, the valve assembly will also close when the pressure at the outlet side exceeds the pressure at the other side of the valve with a certain value. This prevents reverse flow through the filter element, which would blow out dirt collected in the filter element.

In an embodiment of the second aspect of the invention the valve assembly comprises a first spring member biased for moving the valve assembly towards the second valve assembly position. This ensures that the valve assembly always closes in case there is no flow required through the system. Hence, the valve assembly comprises a spring that exerts a force on said valve assembly which urges the valve assembly in said closed position thereof when a pressure difference between a first side of the valve assembly that is open towards the filter element and a second side of the valve assembly that is open towards the outlet port is below a predetermined threshold.

In an embodiment the filter element may comprise an end cap that is open towards the flow channel. The end cap comprises a radial flow passage for allowing fluid to bypass the filter element and a bypass flow valve that is movable between a first position blocking flow through the radial flow passage and a second position allowing flow through the radial flow passage. This allows for the filter element to be bypassed in case the filter element is clogged or obstructed. As a consequence thereof the pressure difference over the filter element increases and the pressure upstream of the filter element, i.e. the pressure at the first side of the filter element, also increases. This increased pressure acts on the bypass flow valve and opens the valve when a certain threshold is exceeded, i.e. when the pressure difference between the first side of the filter element and the second side thereof exceeds a predetermined value. This means that (part of) the fluid flow will bypass the filter element.

In an embodiment of the second aspect according to the invention the valve assembly comprises a first valve element and a second valve element, wherein the first valve element is tubular and open at both axial ends of the first valve element, wherein the first and second valve element are moveable with respect to each other in said axial direction between a valve elements first position and a valve elements second position, wherein, in the valve elements, first position, the second valve element seals against the first valve element to block flow through said first valve element, and wherein, in the valve elements second position, the second valve element and first valve element are axially spaced to define a radial gap allowing flow through said first valve element and through the radial gap.

The first and second valve element, because of the possibility of movement with respect to each other can close access to the second, or clean, side of the filter element and at the same time allow fluid to flow through the first valve element. As the bypass flow valve is urged into its opened position, a so-called reverse flow situation is established in which fluid flows from the outlet towards the inlet without flowing through the filter element. In such cases the pressure in the outlet port is higher than the pressure in the inlet port. This is for example the case when in a hydraulic system the direction of flow is reversed. This pressure difference triggers the movement of the valve. It is highly unwanted that the fluid would flow through the filter element as this would remove the filtered material or debris from the filter element. Hence, a fail safe arrangement is provided, which allows bypass along the filter element in reverse flow direction (as well as in normal flow direction).

Another aspect of the above embodiment of the invention is that the valve assembly can only successfully prohibit a reverse flow situation in case access to the second side of the filter element is obstructed by the second valve element of the non-return valve. This means that the filter assembly only operates correctly when the filter element is provided with an end cap having the features as mentioned above. In turn this means, that it is not possible to use wrong filter elements that do not have the required features. This is beneficial as the use of wrong filter elements will endanger the proper working of the filter assembly and eventually the proper and safe working of the system the filter assembly is part of.

A solution to the problem of using wrong filter elements and in view thereof the problem these wrong filter elements can cause with respect to the rest of the system, such as a hydraulic system, is another object of the invention and is solved by the afore-mentioned embodiment, and for example also with an embodiment according a further aspect of the invention in which, the filter assembly comprises a resilient member for biasing the bypass flow valve in its first position and a core element extending along the second side of the filter element said core element supporting the resilient member. In this manner any filter element that does not comprise the end cap according to the invention will not be able to work with the resilient member which will in turn interfere with the proper working of the valve element.

BRIEF DESCRIPTION OF THE DRAWINGS

Further advantageous embodiments of the filter assembly according to the different aspects of the present invention are described in the claims and in the following description with reference to the drawing, in which:

FIG. 2A in a sectional perspective view depicts an end cap assembly in a first closed position;

FIG. 2B in a sectional perspective view depicts the end cap assembly in a first open position;

FIG. 3A in a sectional perspective view depicts the end cap assembly in a second closed position;

FIG. 3B in a sectional perspective view depicts the end cap assembly in a second open position;

DETAILED DESCRIPTION OF THE INVENTION

Figure 1:
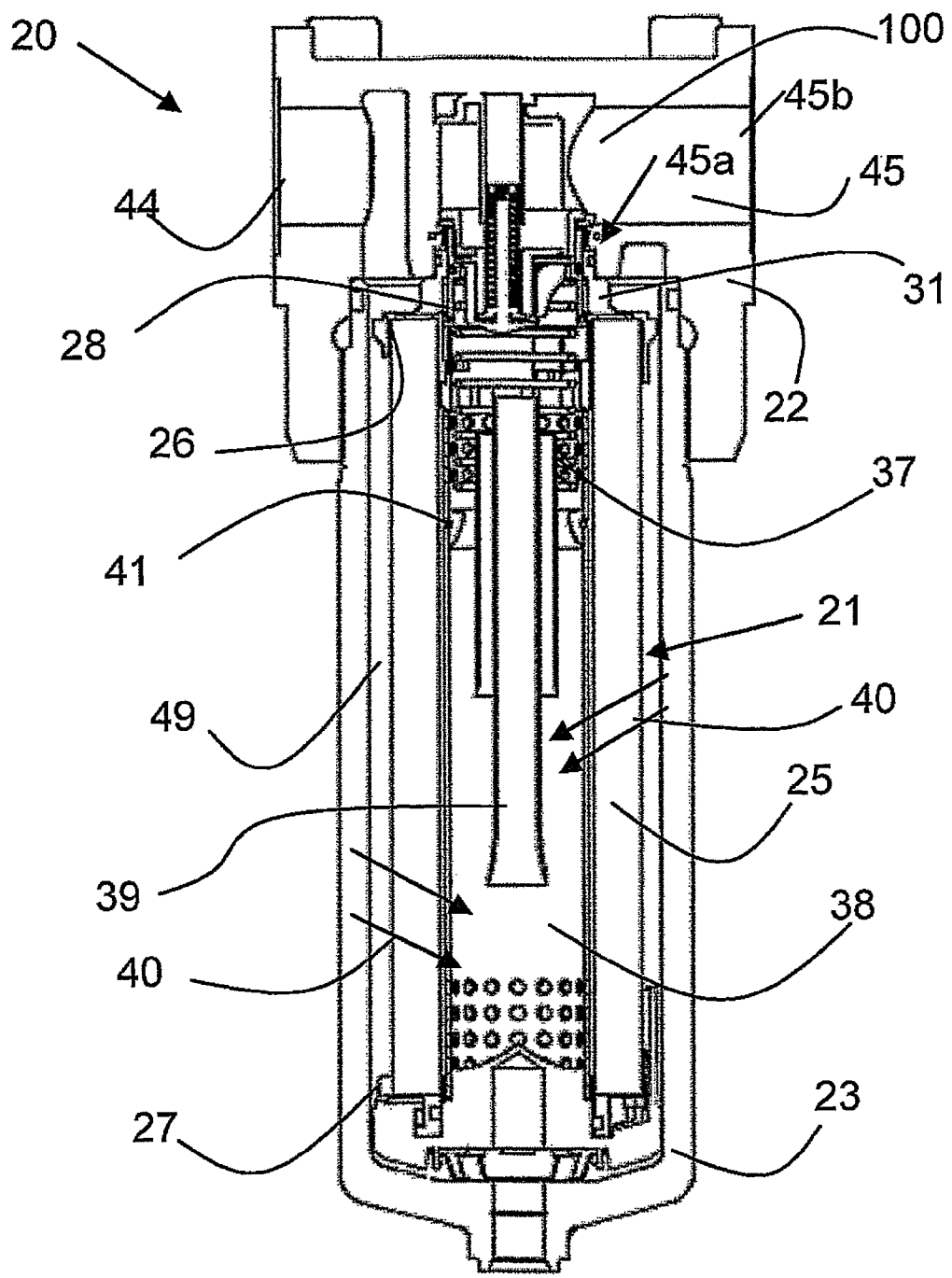
FIG. 1 schematically depicts a cross-sectional view of an exemplary filter assembly according to the invention.

Referring to FIG. 1 an example of a filter assembly according to the present invention is depicted. A filter assembly according to the invention is generally indicated by reference numeral 20. The filter assembly 20 comprises a filter element 21, a filter housing or body 23 and a filter head 22. The filter housing 23 may also be referred to as a bowl or can.

In a manner which is known per se, the filter housing 23 may be removably attached to the filter head 22 to form an interior or interior chamber arranged to contain the filter element 21. The filter element 21 generally comprises a filter medium 25 which preferably is the form of a loop of filter medium of any suitable type. The filter element 21 is provided with an end cap assembly 26 at one end of the filter media and a further end cap assembly 27 at the opposite end of the filter media or filter element 21. The end cap assemblies 26 and 27 preferably are fixedly attached to the ends of the filter media, as by bonding with a suitable adhesive, this being a well known technique in the art.

As will be explained in more detail with respect to FIGS. 2A-3B, the end cap assembly 26 is located and mounted at a first end of said filter element 21. The end cap 26 comprises a tubular portion 28 open at its axial ends and forms with the filter element 21a first fluid flow passage for the fluid to flow through. The end cap assembly 26 further comprises a bypass flow valve 35 (see FIGS. 2A-3B) that allows the fluid to bypass the filter element 21 if circumstances so require.

In the illustrated embodiment, the filter housing or body 23 is removably attached to the filter head 22 by screwing the filter housing 23 onto the filter head. To this end, the filter housing 23 and filter head 22 are provided with correspondingly threaded portions. The threaded portions are coaxial with the filter housing 23 and filter element 21 which preferably are generally cylindrical in cross-section, as shown. The filter housing 23, however, may be removably secured to the filter head 22 by other suitable means, such as by clamps, fasteners, etc. Other cross-sectional shapes of the filter element and/or housing are also contemplated. The filter head 22 includes an inlet port 44 and an outlet port 45 that may have threaded portions for connection to other system components, such as fluid inlet and outlet lines. In most cases, the port 44 will function as an inlet since it communicates with an annular space 49 in the housing that is present between the filter element 21 and the inner surface of the filter housing 23. The annular space 49 surrounds the filter element 21 at a first side thereof establishing a fluid connection with the inlet port 44. The outlet port 45 has a substantially L-shaped design and extends between an annular passage 31 at a proximal side 45a of the outlet port 45 and a distal side 45b of the outlet port 45 that faces away from the filter element 21.

The set up shown in FIG. 1 results in a fluid flow from the inlet port 44 to the annular space 49 and through the filter element 21, i.e. a so-called outside-to-inside flow (also referred to as out-to-in flow). Consequently, the port 45 will function as an outlet passage or outlet port that is in fluid communication with a second side of the filter element, whereby the filter head 22 provides a flow path, i.e. the outlet port 45, for the fluid to flow through between the second side of the filter element 21 and the outlet port 45. The opposite flow configuration is also contemplated, with the hereinafter components being configured to function under such opposite flow configuration. In the example as shown in FIG. 1, the first side of the filter element 21 is the "dirty" side thereof, whereas the second side of the filter element 21 is the "clean" side thereof.

In the filter head 22 a valve assembly 100 is provided, which will be explained in more detail referring to FIGS. 5A-5E. More in particular, the valve assembly 100 is arranged in said flow path between the second side of the filter element and the outlet port 45. It is noted here that in instances where the term 'flow path' is used, it is meant to indicate the flow of fluid through the outlet port 45 which forms a flow path through the filter head 22. It is already mentioned here, that the valve assembly 100 can close an annular passage 31 provided in the filter head 22 in which case the flow along said flow path will be blocked. The valve assembly 100 is operable between the annular passage 31 and the outlet port 45 and is arranged to open and close the annular passage 31. In particular the valve assembly 100 can close the annular passage 31 of the filter head 22 when the filter housing 23 is removed from the filter head 22 by blocking flow from the outlet port 45 towards the annular passage 31 and consequently out of the filter head 22. In other words, the valve assembly 100 acts as a non-return valve.

Now referring to FIGS. 2A to 3B, the end cap assembly 26 is shown in more detail. The end cap assembly 26 comprises a flange part 32 having a generally U-shaped cross-section and is arranged to accommodate a distal end of the filter element 21 (see FIG. 1). The distal end of the filter element 21 can be permanently attached to the end cap 26. The end cap assembly 26 comprises a tubular portion 28 open at its axial or distal ends and forming with the filter element 21a first fluid flow passage, which is generally indicated with arrow A. The tubular portion 28 comprises an annular wall 29 in which a radial flow passage 34 is provided. The radial flow passage 34 preferably comprises a number of separate flow passages that substantially cover the circumference of the annular wall 29.

Inside the end cap assembly 26, in particular telescopically movable within the tubular portion 28 and sealing against an inner surface of the annular wall 29, a bypass flow valve 35 is provided. The bypass flow valve 35 is arranged to be axially or telescopically movable within the tubular portion 28 between a first position blocking flow through the radial flow passage 34, depicted in FIG. 2A, and a second position allowing flow through the radial flow passage 34, depicted in FIG. 2B by arrow B. In this latter position of the bypass flow valve 35, part or all of the fluid flowing through the filter assembly will bypass the filter element 21. Such situations may arise when the filter media is clogged with material that has to be filtered out of the fluid and consequently that the pressure drop over the filter element becomes too great. In such a situation the pressure outside the end cap assembly 26, i.e. at the first side of the filter element 21, increases, or at least the pressure difference between the interior of the end cap assembly 26 (and thus the interior or second side of the filter element 21) increases, and the pressure difference will urge the bypass flow valve 35 in a downward direction as indicated with arrow C in FIG. 2B. To achieve this, the bypass flow valve 35 comprises a pressure ridge 36 which is exposed to the fluid pressure in the inlet port 44 or upstream of the filter element 21, i.e. the first side of the filter element 21.

To allow the bypass flow valve 35 to move from its closed to its open position, the tubular portion 28 comprises a stop member 43, shaped as an inwardly extending ridge, that limits movement in the direction of arrow A, i.e. an upward movement of the bypass flow valve 35. As can be seen in FIG. 2A, further upward movement of the bypass flow valve 35 is limited when an axially extending lip 46 abuts the stop member 43. To allow downward movement, i.e. movement of the bypass flow valve 35 to its second or open position, the tubular portion 28 has a recess 47 which can guide a second axially extending lip 48 of the bypass flow valve 35.

It is to be understood that the bypass flow valve 35 should only move to its second position of FIG. 2B in case the circumstances require so. Hence, unwanted movement of the bypass flow valve 35 should be avoided and the bypass flow valve 35 should be kept in its first and closed position of FIG. 2A during normal use, i.e. the fluid flows through the filter element 21. In order to achieve this, a resilient member or bypass spring element 37 is provided with reference to FIG. 1, which exerts a force on the bypass flow valve 35 such that the bypass flow valve 35 is biased towards its first or closed position.

The bypass spring element 37 is in the example of FIG. 1 with its lower end supported by a core element 38 by means of a support ridge 41. With its upper end the spring element 37 abuts against a retention ridge 42 (see FIG. 2A, 2B) which has a smaller diameter than the (preferably) circular bypass spring element 37.

The core element 38 is designed to support the filter medium of the filter element 21 and is arranged, in the example of FIG. 1, inside the filter element 21, i.e. on the second side of the filter element, and is arranged very close to or against the inner surface thereof. The core element 38 substantially covers the second side of the filter element 21. The core element 38 as shown in FIG. 1 comprises a tubular structure and houses a flow conduit 39 which is not part of the present invention, but which serves to reduce turbulence inside the filter element 21 to reduce power consumption of the filter assembly. The core element 38 can be a cylindrical tube of stainless steel. In the arrangement as shown, the tubular structure is arranged along an inner surface of the filter medium. By doing so, the core element 38 provides support to the filter medium when an out-to-in flow (indicated by the arrows 40) occurs through the filter element 21. As such, the core element 38 substantially prevents the filter medium from deforming under the pressure difference that exists across it. Without the provision of the core element 38, the filter element 21 could buckle under the pressure load and the filter assembly 20 would not function properly.

With reference to FIGS. 2A and 2B, it is noted that the configuration of the bypass flow valve 35 shown is used when the filter assembly 20 is used in the earlier mentioned out-to-in flow, i.e. the fluid flows from the inlet port 44 through the annular space 49 through the filter element 21 and the core element 38 towards the annular passage 31 and out of the filter head 22 through the outlet port 45. It is also possible however that the filter assembly works according to the in-to-out principle in which the fluid substantially flows in an opposite direction. Turning to FIG. 3A, this is indicated with arrow D. This means, however, that the bypass flow valve 35 shown in FIGS. 2A and 2B is no longer working correctly as the higher pressure in the filter assembly 20 will be found in the interior of the end cap assembly 26 which would urge the bypass flow valve downwards (see FIG. 2B) in its open position.

To this end, the end cap assembly 26 and in particular the axially movable bypass flow valve 35 can be adjusted such that the bypass flow valve 35 moves upwards in FIG. 3A, i.e. in a direction as indicated with arrow E in FIG. 3B, thus opening the radial flow passage 34 when the filter element 21 gets clogged and a bypass flow condition is required.

To achieve this double working feature of the bypass flow valve 35, the bypass flow valve 35 can be turned or rotated inside the tubular portion 28 in a clockwise direction (arrow F) starting from the position as shown in FIG. 2A to arrive at the position shown in FIG. 3A. In this position the axially extending lip 46 is aligned with a recess 50, which allows the lip 46 to move beyond the stop member 43. It is noted that several lips and recesses can be provided.

While turning the bypass flow valve 35 as described above, the second lip 48 is rotated also and is positioned over a second stop member 51 which is shaped as an inwardly extending ridge. The second stop member 51 prohibits any downward movement of the bypass flow valve 35.

As mentioned with reference to FIGS. 2A and 2B, the bypass flow valve 35 should in normal use be biased in its closed position. To achieve this with the embodiment of the bypass flow valve 35 as shown in FIGS. 3A and 3B, the bypass flow valve 35 should be biased downward. Hence, an alternative bypass spring member is required which acts in an opposite direction as the bypass spring element 37 of FIG. 1. This is shown in FIG. 4.

Figure 4:
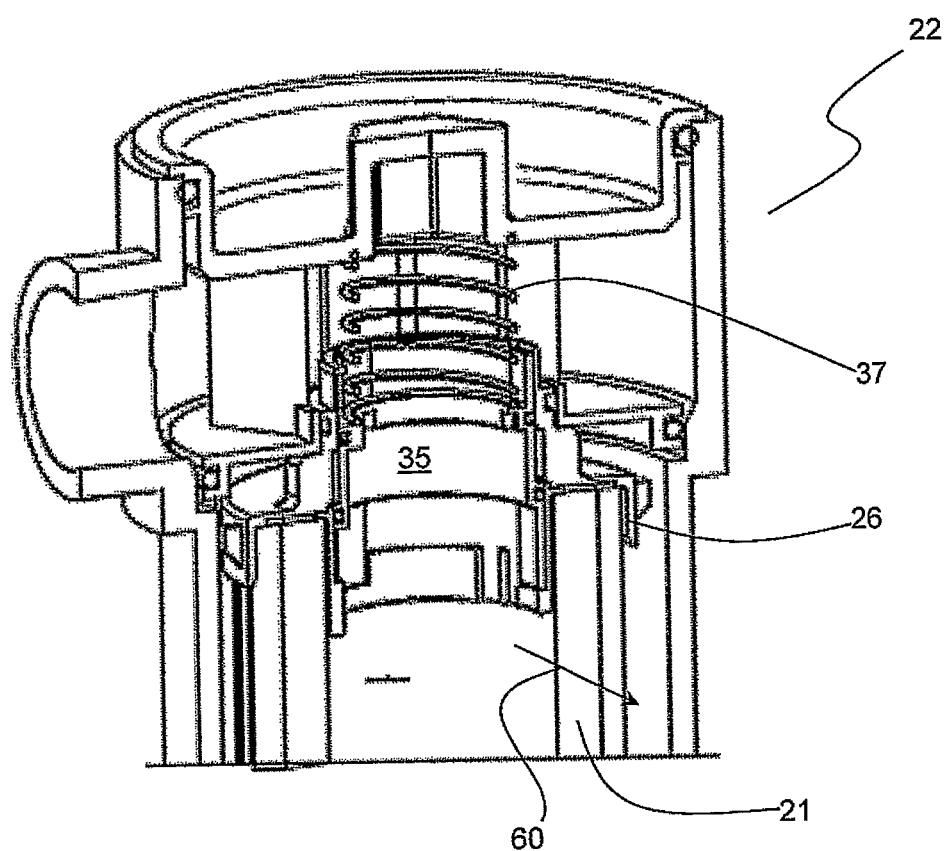
FIG. 4 in a sectional perspective view depicts an alternative filter head employing the end cap assembly of FIG. 3A.

Referring now to FIG. 4, an alternative filter head 22 is shown in a spatial cut-away view in a situation wherein the filter assembly is working according to the in-to-out flow principle. This is schematically indicated with arrows 60. FIG. 4 again shows the end cap assembly 26 and the filter element 21. FIG. 4 further shows the bypass spring element 37 which is mounted inside the filter head 22 and is arranged to exert a force on the bypass flow valve 35 that biases is in its closed position.

It is noted here that the advantages of the bypass flow valve 35 as described above are also achieved independent from the other features of the inventive filter assembly as described herein and thus such a bypass flow valve can be applied independent from said other features without departing from the scope of the present invention.

Figure 5A:
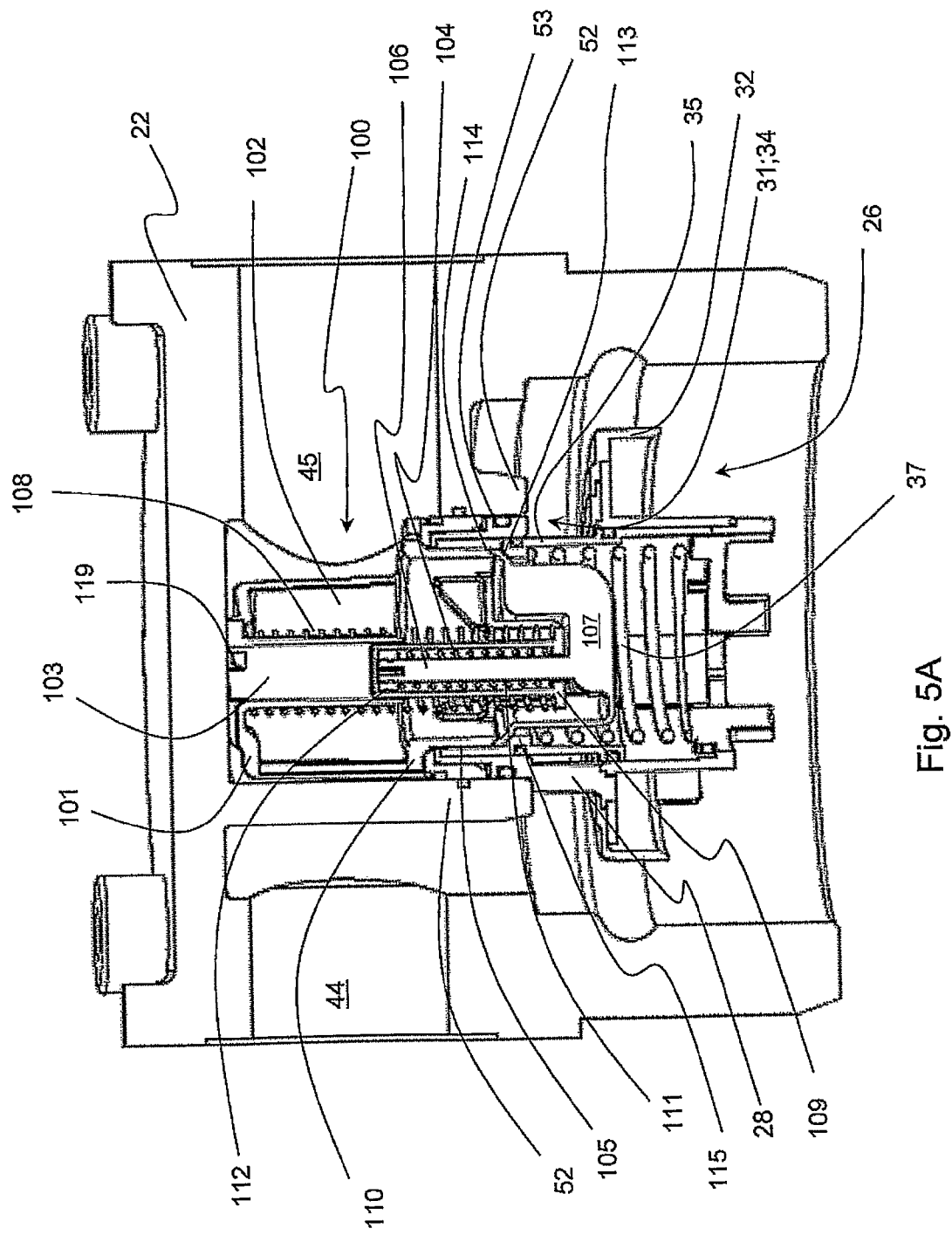
FIG. 5A schematically depicts in sectional view a filter head with a valve assembly in no-flow-condition.

Referring now to FIG. 5A, the filter head 22 of the filter assembly 20 is shown in a cross-sectional view. The filter element 21 and the filter housing 23 are not shown to improve clarity of the drawing. In the filter head 22 a valve assembly 100 is provided which is mainly seated in the annular passage 31 provided in the filter head 22. The annular passage 31 is located between the inlet port 44 and the outlet port 45 and accommodates the upper part of the end cap assembly 26, more in particular the upper part of the tubular portion 28. The annular passage 31 comprises an annular wall section 52 which encloses the upper part of the tubular portion 28. Between the tubular portion 28 and the annular wall section 52 a seal 53 is provided, which may be an O-ring for example.

The valve assembly 100 is moveable between the annular passage 31 and the outlet port 45 and is arranged to open and close the annular passage 31. In particular the valve assembly 100 can close the annular passage 31 of the filter head 22 when the filter housing 23 is removed from the filter head 22 by blocking flow from the outlet port 45 towards the annular passage 31 and consequently out of the filter head 22. In other words, the valve assembly 100 is arranged in the flow path between the second or clean side of the filter element 21 and the outlet port 45. The valve assembly 100 is arranged to be moveable between a first valve assembly position allowing flow through the outlet port 45 and a second valve assembly position blocking flow through the outlet port 45.

The valve assembly 100 comprises a valve housing or gage 101. The gage 101 is tubular in design and has a radial flow passage 102 which is open towards the outlet port 45. The radial flow passage 102 spans about a quarter to about half of the circumference of the gage 101 to allow the fluid to flow through the valve assembly 100 and towards the outlet port 45 with as low a flow resistance as possible. The gage 101 comprises a tubular guide 103 for telescopically guiding a stem 104 of a first valve element 105. The stem 104 in turn is a tubular element which telescopically guides a second stem 106 of a second valve element 107. Hence, the first valve element 105 and the second valve element 107 are axially movable with respect to each other.

Figure 5B:
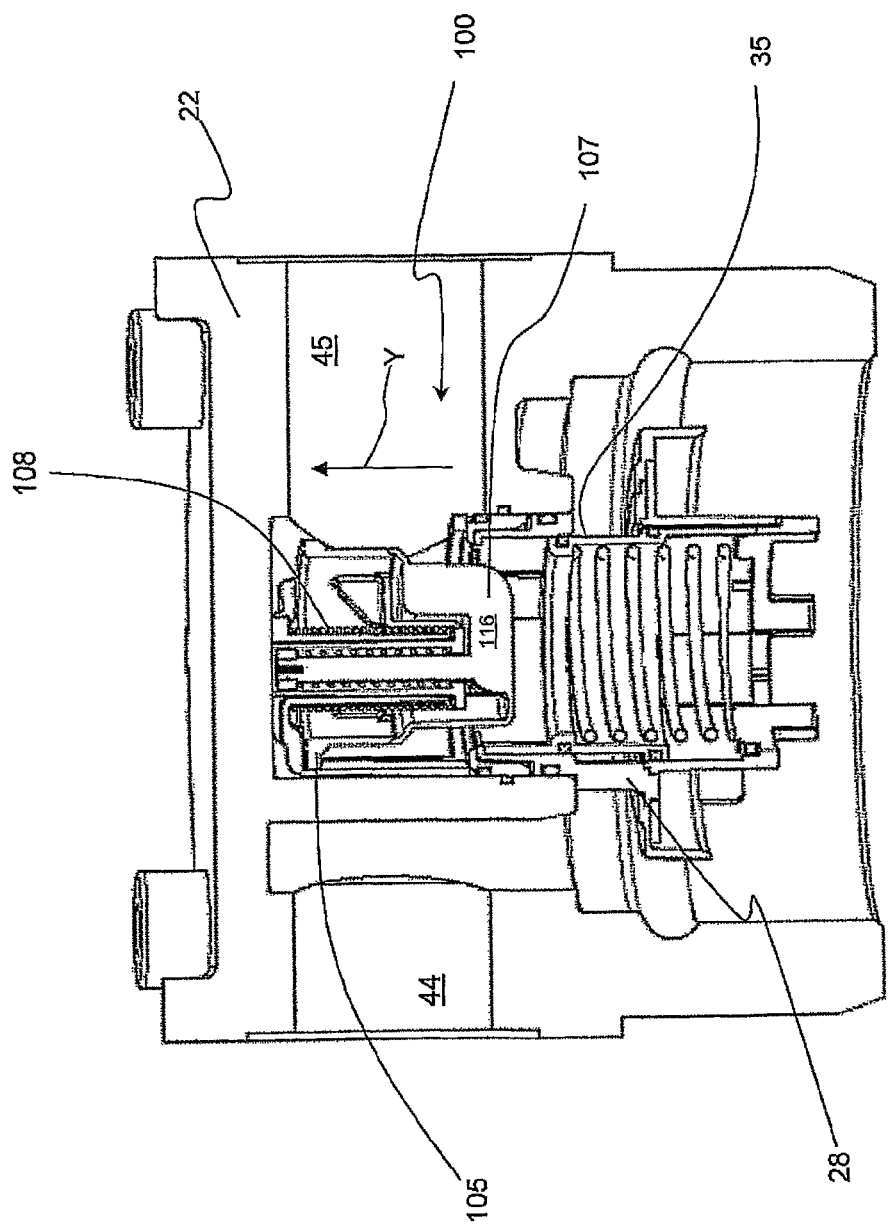
FIG. 5B schematically depicts in sectional view the filter head with the valve assembly in normal-flow-condition.
Figure 5C:
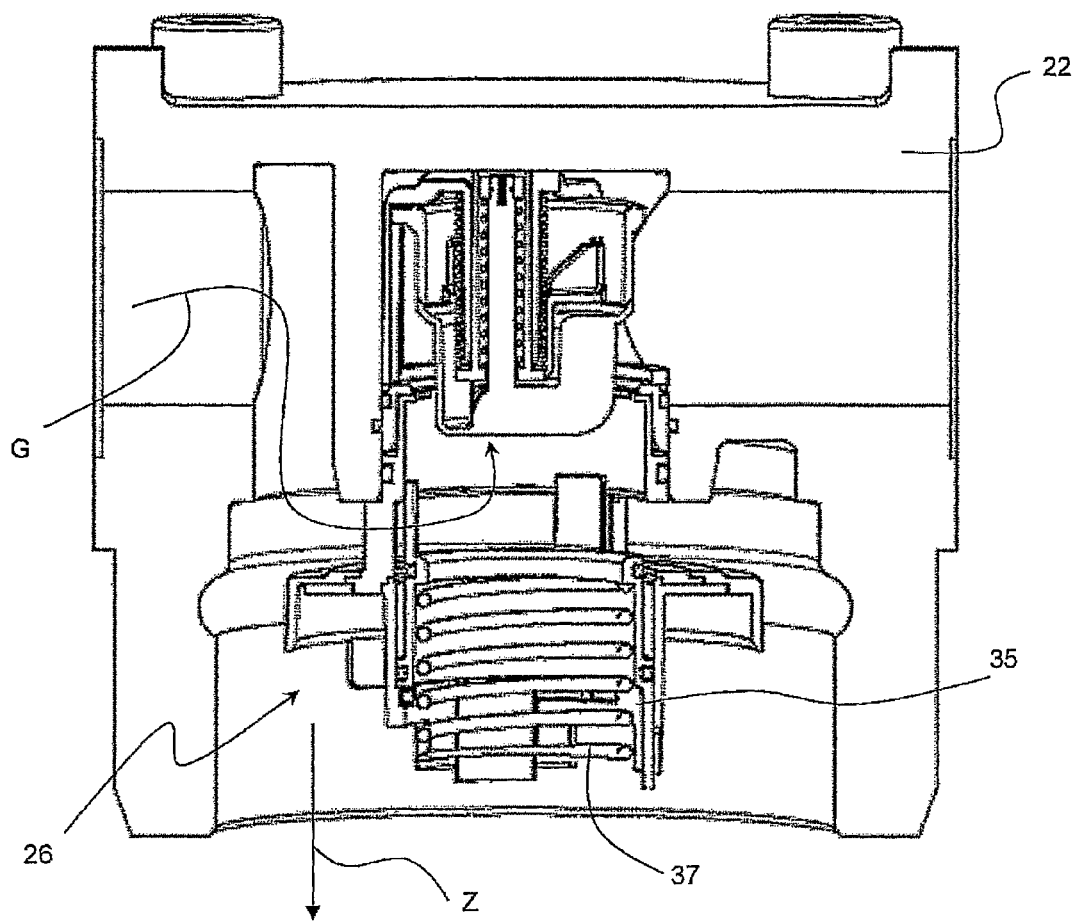
FIG. 5C schematically depicts in sectional view the filter head with the valve assembly in bypass-flow-condition.
Figure 5D:
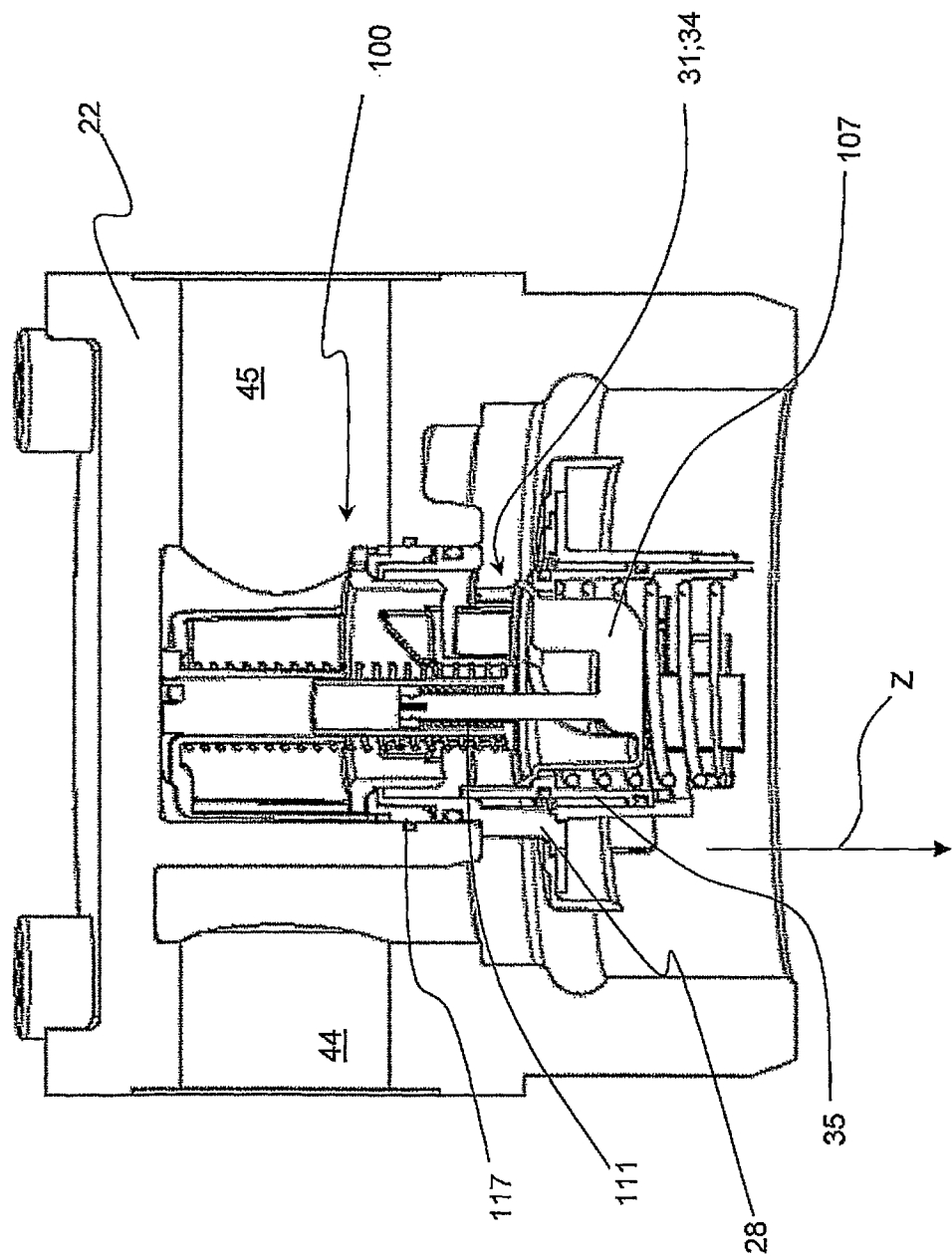
FIG. 5D schematically depicts in sectional view the filter head with the valve assembly in reverse-flow-condition.
Figure 5E:
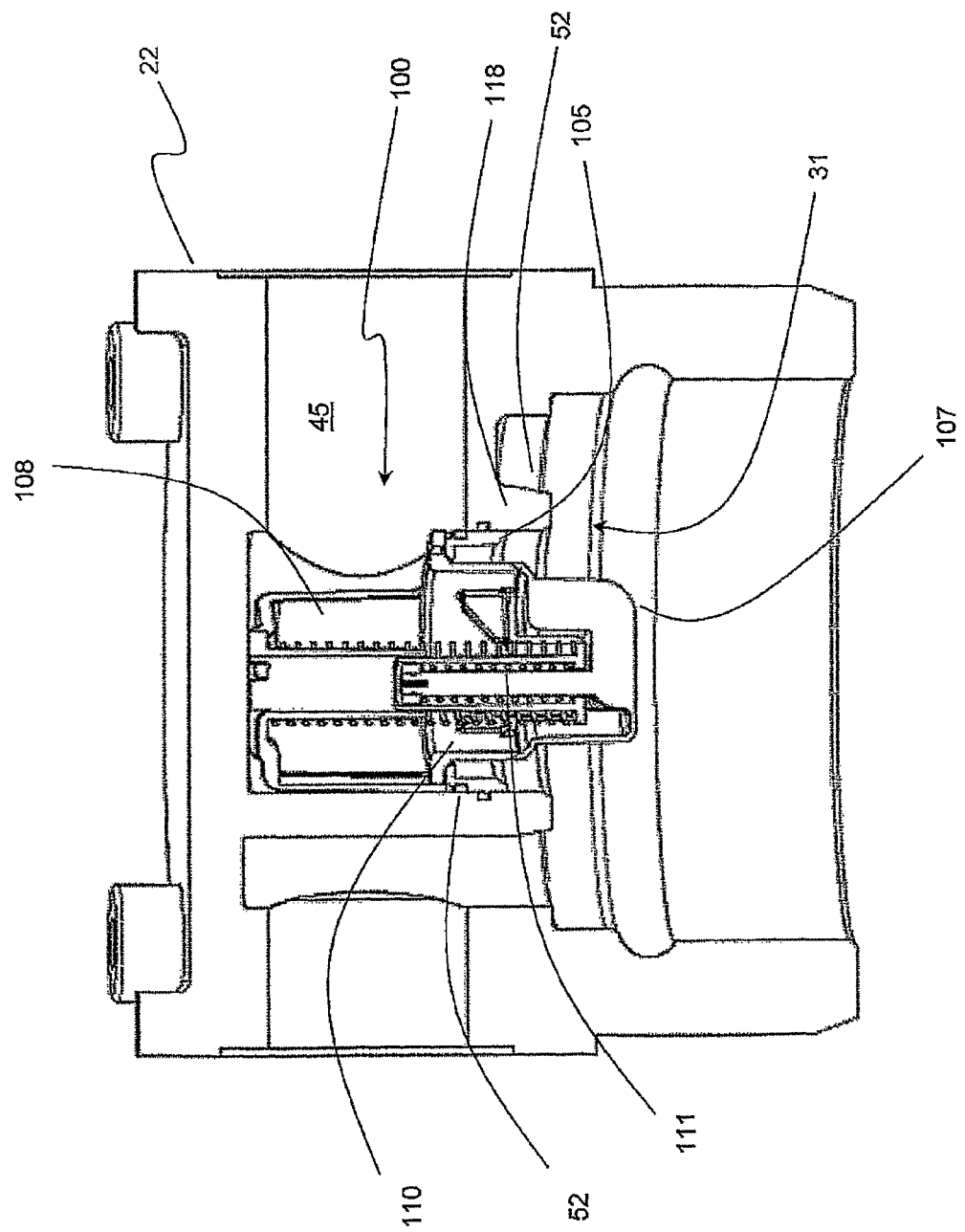
FIG. 5E schematically depicts in sectional view the filter head with the valve assembly in no-element-condition.

Between the gage 101 and the first valve element 105 and located around the tubular guide 103, a first compression spring 108 is provided which rests on a flange 109 of the first valve element 105, thus biasing the first valve element 105 downwards in FIG. 5A such that an upper annular rim 110 the first valve element 105 seats on an annular seal ring 118 (see FIG. 5E). As can be seen in FIG. 5A, the second stem 106 of the second valve element 107 is located inside the tubular stem 104 of the first valve element 105 and a second compression spring 111 is provided between an end part 112 of the second stem 106 and an inner portion of the flange 109.

The second compression spring 111 biases the second valve element 107 upwards in FIG. 5A such that a rim 113 of the second valve element 107 seats against a lower edge 114 of the first valve element 105.

The first valve element 105 and the second valve element 107 substantially form a single valve in the situation shown in FIG. 5A because of the force exerted by the second compression spring 111. In fact, and as will be explained in more detail below, the single valve functions as a non-return valve. In the position in which the first valve element 105 and the second valve element 107 are sealed against each other, the valve elements are in a valve elements first position. Furthermore, in the situation of FIG. 5A, the rim 113 of the second valve element 107 seats on a inner rim 115 of the bypass flow valve 35 such that the annular passage 31 is closed and no fluid can flow through the valve assembly 100 in either direction. Furthermore, the bypass flow valve 35 is in its closed or first position, blocking flow through the radial flow passage 34 as was explained with reference to FIGS. 2A-3B. Hence, the position of the valve element 100 and the bypass flow valve 35 of FIG. 5A can be denoted as no-flow-condition.

During normal use of the filter element, which can be denoted as normal-flow-condition, the fluid to be filtered will flow through the filter element 21 (out-to-in flow) and through the valve assembly 100 towards the outlet port 45 along the flow path provided by the filter head 21 between the second side of the filter element 21 and the outlet port 45. This situation is shown in FIG. 5B.

In comparison with the no-flow-condition of FIG. 5A, the first valve element 105 and the second valve element 107, in the valve elements first position, have moved upward in FIG. 5B (indicated with arrow Y) as a single valve under the influence of an increased fluid pressure, wherein said increased fluid pressure must be large enough to overcome the force exerted by the first compression spring 108. In the normal-flow-condition of FIG. 5B, the fluid will flow through the tubular portion 28, pass the closed bypass flow valve 35 and along a profiled flow guide surface 116 of the second valve element 107 towards the outlet port 45.

When the first valve element 105 and the second valve element 107 move upwards in unison as indicated in FIG. 5B, fluid that will be present in the tubular guide 103, which is open at its distal end (see FIG. 5A), can be pushed out via said open distal end by the provision of a radially extending flow channel 119, causing a damping function of the valve (see FIG. 5A).

As explained with reference to FIGS. 2A-3B, in certain circumstances it is required that the fluid flow may bypass the filter element 21. This situation is denoted as bypass-flow-condition and is shown in FIG. 5C.

In comparison with the normal-flow-condition shown in FIG. 5B, the bypass flow valve 35 has been moved in a downward direction in FIG. 5C (indicated with arrow Z) due to an increased pressure outside of the end cap assembly 26 and against the bias force of bypass spring element 37. The fluid is now able to bypass the filter element as is indicated with arrow G. It is noted here, that the length of the bypass spring element 37 can be adjusted by changing the position of the retention ridge 41 (see FIG. 1). By increasing the length of the bypass spring element 37, the hysteresis of the spring element 37 can be reduced and a better and more accurate control of the opening and closing of the bypass flow valve 35 can be achieved.

In certain exceptional circumstances a flow condition denoted as reverse-flow-condition is present in the filter assembly according to the invention. This reverse-flow-condition is shown in FIG. 5D. In this situation the fluid flows from the outlet port 45 towards the inlet port 44 and should do so without flowing through the filter element. The latter is highly unwanted as this would remove the filtered material or debris from the filter element. In the reverse-flow-condition the radial flow passage 34 must hence be open in order to bypass the filter element, but still the fluid must not be able to reach the interior, or second side of the filter element.

To achieve this, the increased pressure in the outlet port 45 will move both the first valve element 105 and the second valve element 107 in a downward direction (indicated with arrow Z) in unison as a single valve (non-return valve functionality). Downward movement of the first valve element 105 is however limited by a stop member 117 on which the upper rim 110 of the first valve element 105 seats. The lower part of the first valve element 105 is designed as a spider case and comprises axial flow passages or openings that allow fluid to flow through the lower part of the first valve element 105 towards the second valve element 107. As, in the reverse-flow-condition, the increased fluid pressure is still present, the pressure will push against the second valve element 107 such that it is moved further in a downward direction against the force exerted by the second compression spring 111. In its downward movement, the second valve element 107 will push or urge the bypass flow valve 35 via its inner rim 115 downward also, opening the radial flow passage 34 while at the same time blocking flow through the annular passage 31. This position, in which the first and second valve elements are axially displaced with respect to each other, is denoted as a valve elements second position. It is noted that the pressure that is required to push both the second valve element 107 and the bypass flow valve 35 downwards will be lower that the pressure required to only move the bypass flow valve 35 into its second position (opening the radial flow passage 34), because the combined area of the second valve element 107 and the bypass flow valve 35 is larger than the area of the inner rim 115 of the bypass valve element 35.

In other words, for a reverse flow situation to be possible the valve assembly 100 comprises a first valve element 105 and a second valve element 107, wherein the first valve element 105 is tubular and open at both axial ends of the first valve element 105, wherein the first 105 and second 107 valve element are moveable with respect to each other in said axial direction between a valve elements first position and a valve elements second position, wherein, in the valve elements, first position, the second valve element 107 seals against the first valve element 105 to block flow through said first valve element, and wherein, in the valve elements second position, the second valve element 107 and first valve element 105 are axially spaced to define a radial gap allowing flow through said first valve element and through the radial gap.

As has been explained above, the filter element 21 needs to be periodically replaced and the filter head 22 and filter housing 23 can be separated. To avoid unwanted spilling of fluid when separating the filter housing 23 and the filter head 22 when the filter element 21 needs to be replaced the valve assembly 100 and in particular the first valve element 105 and the second valve element 107 when working as a single valve is/are arranged to close the annular passage 31 such that any fluid remaining in the filter head 22 and/or in a conduit attached to the outlet port 45 is blocked from flowing out of the filter head 22. Hence, the single valve will than act as a non-return valve and separation the filter housing 23 from the filter head 22 can be done without the risk of spilling fluid which is present downstream of the filter assembly 20. The condition in which the filter housing 23 and with it the filter element 21 has been separated from the filter head 22 is denoted as no-element-condition and is shown in FIG. 5E.

In order for the valve assembly 100 to function properly, the bias force of the second spring member 111 is larger than the bias force of the first spring member 108.

The no-element-condition is shown in FIG. 5E, which condition mainly corresponds to the no-flow-condition as explained with reference to FIG. 5A except that the end cap assembly 26 is no longer present. As can be seen in FIG. 5E the annular passage 31 or the flow path through the filter head 21 is closed as the first valve element 105 and the second valve element 107 form a single or unitary non-return valve under the influence of compression spring 111. The actual closing of the annular passage 31 is achieved by pushing the upper rim 110 of the first valve element 105 by means of the compression spring 108 onto an annular seal ring 118 which is fixedly mounted to the wall section 52. The non-return valve is arranged to close when the pressure difference at its side directed towards the outlet port exceeds the pressure at its side directed towards the second side of the filter element, i.e. where that second side would be in case the filter element was installed. It is noted here that the pressure that is present in the fluid that is still present in the outlet port 45 and/or in any conduits attached thereto is not necessarily equal to the working pressure when the hydraulic system is operative. Prior to removal of the filter element from the filter housing, the hydraulic fluid present in the filter housing is drained therefrom via a discharge opening 120 (see FIG. 6 for further details). Hence, the pressure in the system is slowly reduced.

In the example of a filter head 22 shown in FIGS. 5A-5E, the inlet port 44 and the outlet port 45 are located on opposite sides of the filter head 22, or in other words, the inlet port 44 and the outlet port 45 are substantially co-axial. It is however also possible to arrange the inlet port 44 and the outlet port 45 differently in the filter head 22, depending on for example the availability of space in a hydraulic system or a specific layout of flow lines. As an example it can be contemplated to arrange the inlet port 44 and the outlet port 45 on one side of the filter head 22, in particular the outlet port 45 may be arranged above the inlet port 44. This would mean, that the valve assembly 100 does not have to divert the flow direction of the fluid flowing through the valve assembly 100, but the fluid follows a generally straight line through the valve assembly 100. This can be achieved, for example, by providing the valve housing (or gage) 101 with an open structure, e.g. by providing the valve housing 101 with axial flow passages.

It is noted here that the advantages of the valve assembly 100 as described above are also achieved independent from the other features of the inventive filter assembly as described herein. In particular the valve assembly 100 may for example be used with a filter element that is not provided with a bypass flow valve as discussed. In such a case the first end cap assembly may however require modification to enable all possible flow configurations of the valve assembly.

Figure 6:
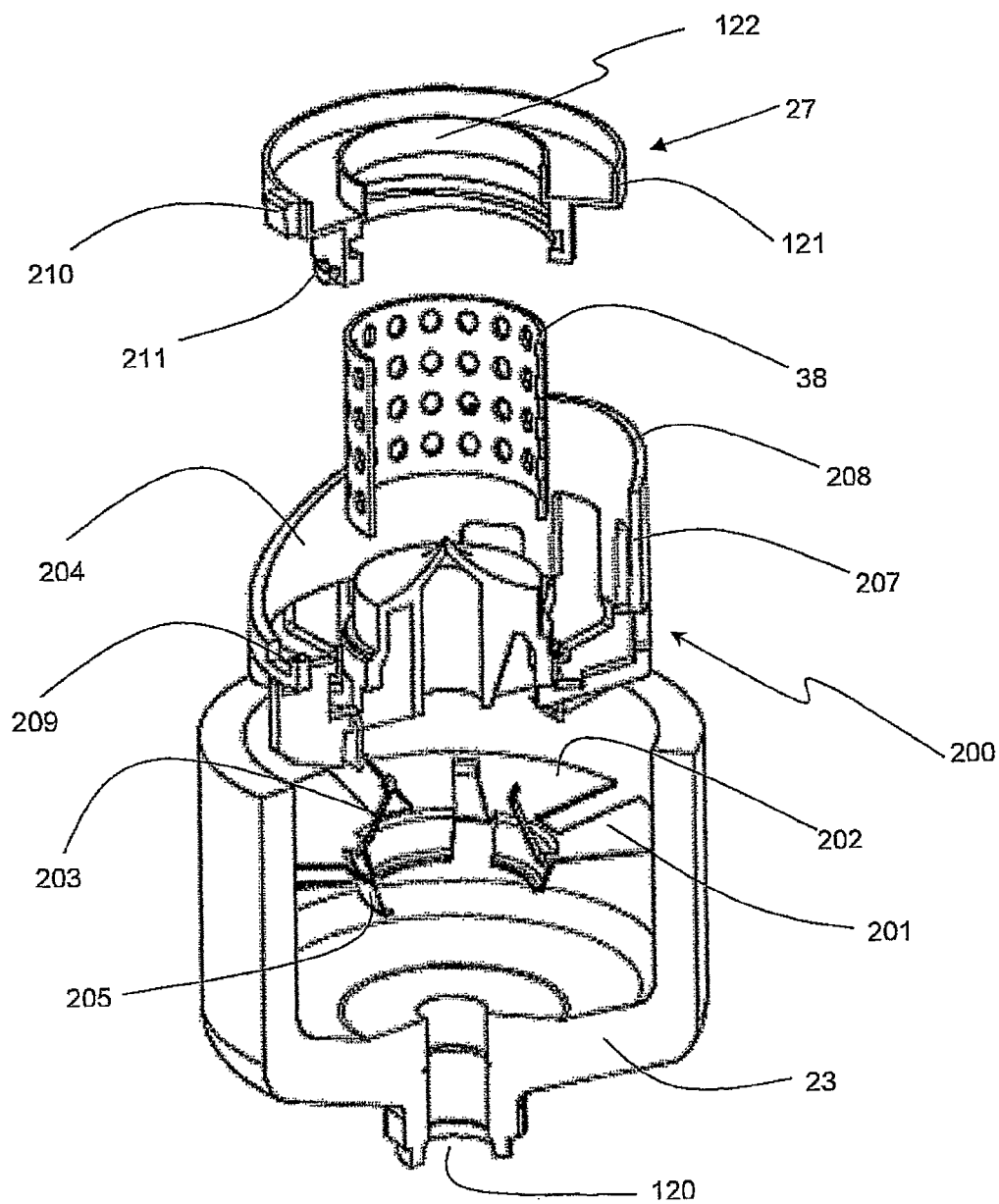
FIG. 6 depicts in an exploded view a part of a filter housing with a coupling assembly.

In FIG. 6 a further aspect of the present invention is shown. FIG. 6 shows, in an exploded spatial view, part of the filter housing 23 and in particular its bottom part. In the example of FIG. 6 (and of FIG. 1) the filter assembly is arranged to be connected to a conduit system while the filter assembly extends in a downward direction. For that reason the filter housing 23 is provided with a discharge opening 120 in the bottom part of the filter housing 23 that allows draining of the fluid from the filter housing 23. Normally the discharge opening 120 would be provided with a plug, which is not shown in the drawing.

The filter element comprises and end cap assembly 27 located opposite the end cap assembly 26 that comprises the bypass flow valve 35. In FIG. 6 the end cap assembly 27 is shown without the filter element. Similarly to the design of the other end cap assembly, the end cap assembly 27 comprises a generally U-shaped flange part 121 for attaching the filter element thereto. Further, the end cap assembly 27 comprises a tubular portion 122 which encloses the core element 38.

Figure 7:
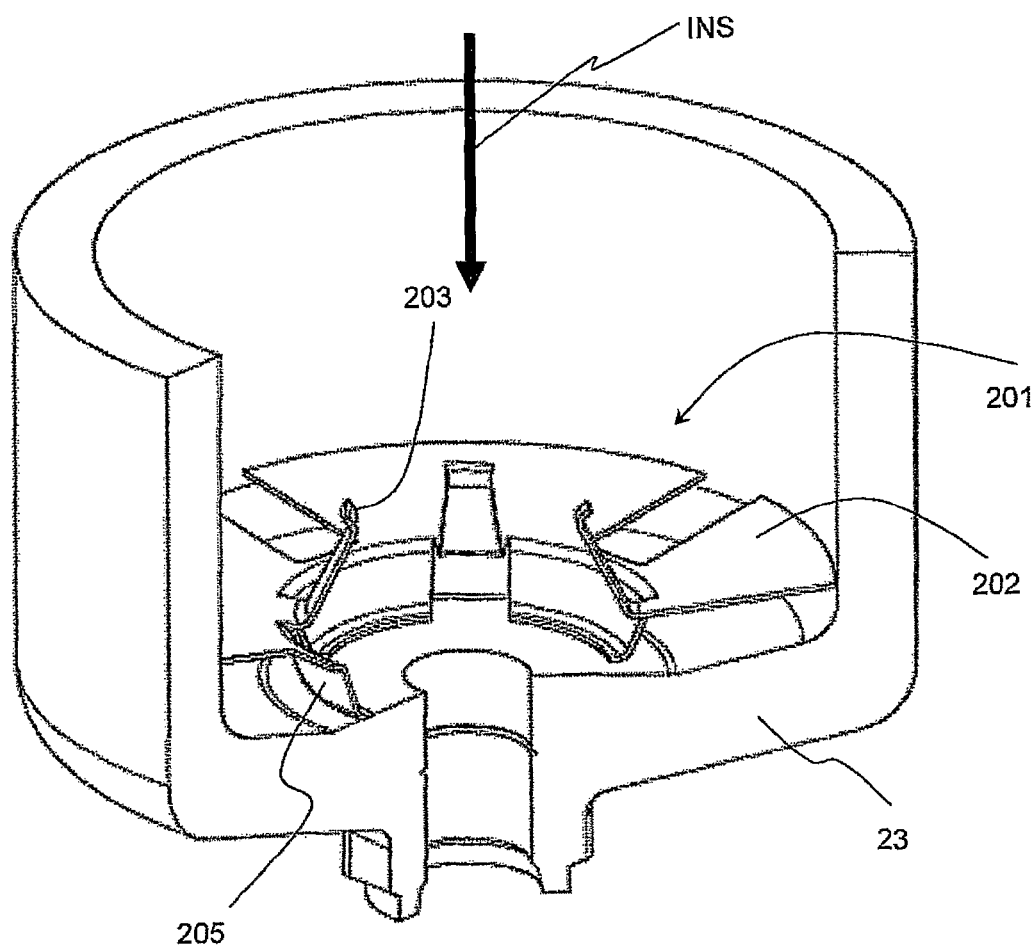
FIG. 7 schematically depicts in sectional view a part of the filter housing with a lockring.

A coupling assembly 200, which is insertable in the filter housing 23 in an insertion direction, indicated with an arrow INS in FIG. 7, is provided in the filter housing 23 for coupling the core element 38 to the filter housing 23. The coupling assembly 200 comprises a coupling member 201 which is preferably designed as a leaf spring, in particular a resilient lock ring 201, having a peripheral or free outer edge 202a (see FIG. 7) that closely corresponds to an inner surface of the filter housing 23. In fact, the outer edge 202a of the leaf spring 201 has a larger span, e.g. a larger diameter in case the leaf spring is circular, than the inner diameter of the filter housing 23. It is noted here that the term diameter is not intended to limit the cross-sectional shape of the filter housing to circular cross-sections only. The term diameter must be understood to mean a cross-sectional dimension. The leaf spring 201 comprises a number of radially extending resilient elements 202 that comprise the outer edge 202a of the leaf spring 201 and which contact or engage the inner surface of the filter housing 23 and allowing a resilient deformation upon insertion of the leaf spring into the filter housing 23. As can be seen in FIG. 7, the deformation will involve a bulging of the leaf spring 201 in the direction of insertion INS. The lock ring 201 has a concave cross-section that does allow introduction into the filter housing 23 because the resilient elements 202 can flex upward while pushing the lock ring 201 downward in FIG. 6, but extraction will cause the lock ring 201 to bend in the opposite direction which urges the resilient elements 202, and thus the outer edge, against the inner surface of the filter housing 23, locking it in place. When the lock ring 201 is fully inserted into the filter housing 23, a number of support legs 205 support the lock ring 201. This is shown in more detail in FIG. 7.

The coupling assembly 200 and in particular the lock ring or leaf spring 201 comprises a number of grip members 203 or latches that may act as a connecting part and that can be arranged to grip an intermediate coupling member 204 that is part of the coupling assembly 200 and which comprises recesses 206 (see FIG. 8) into which the latches 203 can be inserted. Hence, via the intermediate coupling member 204 the core element 38 can be connected to the leaf spring 201 and can thus be connected to the filter housing 23. The latches 203 are angled upwardly and are resilient, such that the intermediate coupling member 204 and therewith the filter element and/or the core element 38 are biased in an upward direction in FIG. 8. In the example shown, the grip members 203 are mainly provided to reduce play and not as much as coupling members. An alternative solution to bias the intermediate coupling member 204 in an upward direction is shown with reference to FIG. 9, wherein a compression spring 220 is shown that is operable between the filter housing 23 and the intermediate coupling member 204. Further, the intermediate coupling member 204 can be provided with additional coupling means, such as coupling fingers 225 (see FIG. 8) that extend through coupling openings 226 in the coupling member 201 However, other solutions for coupling the intermediate coupling member 204 are also conceivable without departing from the scope of the invention.

It is noted here that it is also possible to directly attach the core element 38 to the leaf spring 201.

The intermediate coupling member 204 has a peripheral wall or wall portion 207 which extends in a longitudinal direction H-H of the filter housing 23. The wall portion 207 has a guide or support surface 208 which lies in a plane which is non-perpendicular, i.e. angled, with respect to said longitudinal direction H-H. The wall portion 207 further comprises a slot 209.

The guide surface 208 is designed to co-operate with a projection 210 provided on the end cap assembly 27 and which extends radially outward from the flange part 121. The projection 210, upon introduction of the filter element into the filter housing 23 will have an arbitrary rotational position with respect to the intermediate coupling member 204. To assure and simplify mounting of the filter element, the projection 210 will be guided along the guide surface 208 until it reaches the location of the slot 209. Positioning of the filter element can be further facilitated by the provision a further projection 211 which is provided on the end cap assembly 27 and engages a further slot 212. This is also shown in FIG. 8, wherein it is shown how the coupling assembly 200 is coupled with the filter housing 23.

Figure 8:
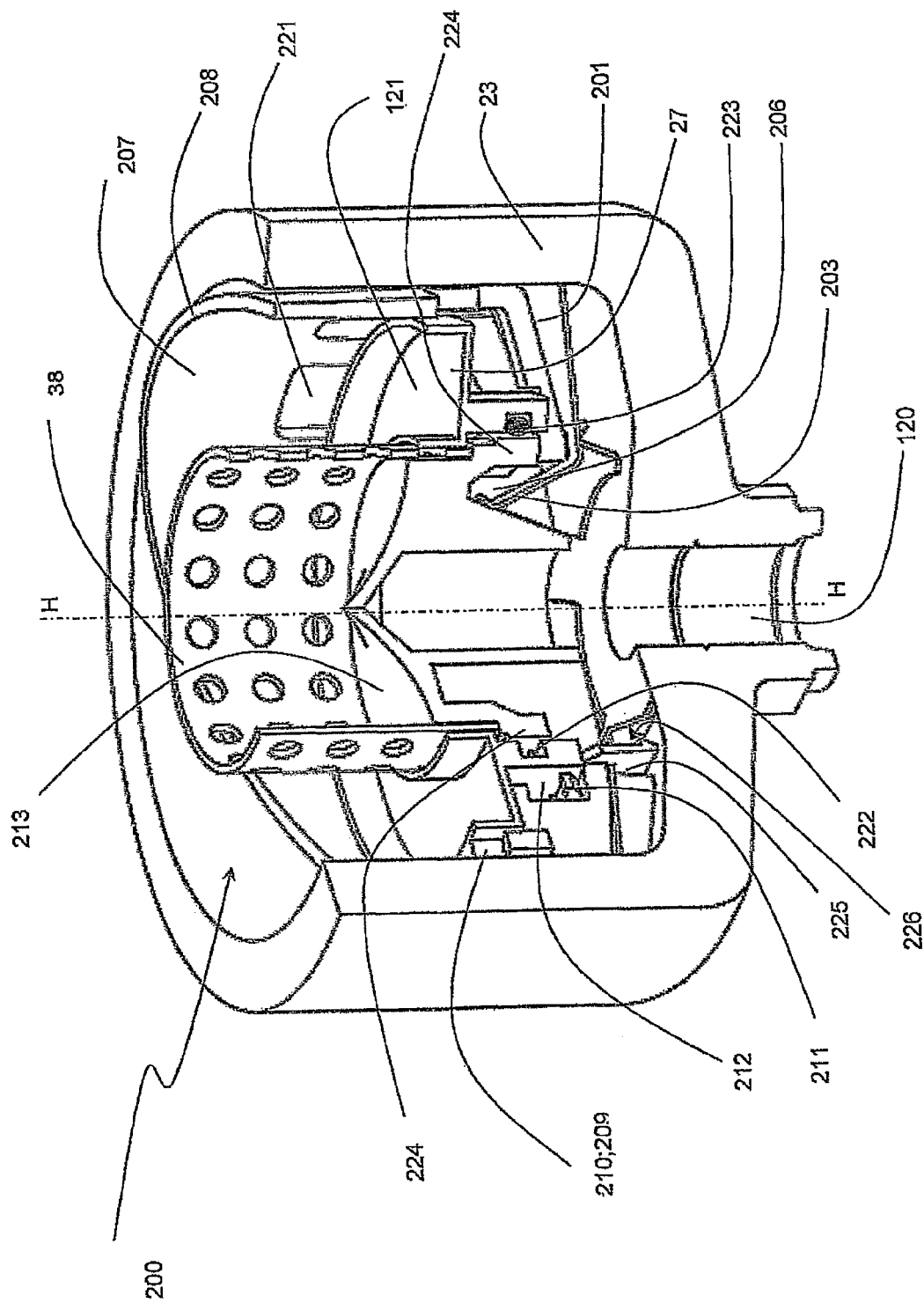
FIG. 8 schematically depicts in sectional view a part of the filter housing with the lockring, coupling member and end cap assembly mounted.

As can be further seen in FIGS. 6 and 8, the core element 38 is positioned between the annular portion 122 of the end cap assembly 27 and an upwardly directed flow guide means 213 provided on the intermediate coupling member 204. The flow guide means 213 is arranged to guide the fluid in an upward direction and reduces turbulence in the lower part of the filter assembly. The core element 38 is clamped around the flow guide means 213, i.e. there exists a tight fit between both parts. It is noted however that the provision of the flow guide means is not mandatory. What is relevant for the way of coupling the core element 38 to the intermediate coupling member 204 in the example of FIGS. 6 and 8 is, that an element is provided that can engage the inner circumference of the core element 38 to establish a coupling. It is noted that it is also possible to permanently couple the core element 38 to the intermediate coupling member 204.

The end cap assembly 27 and the intermediate coupling member 204 are sealed against each other to assure that dirty or contaminant-loaded fluid cannot reach the clean side of the filter element. This is particularly true as the contaminant-loaded fluid is able to reach that part of the filter housing 23 that contains the discharge opening 120. For the contaminant-loaded fluid to be able to reach the discharge opening 120, the peripheral wall portion 207 is at its tallest part provided with flow passages 221. For the same reason the intermediate coupling member 204 has an open structure to allow fluid to reach the discharge opening 120. The problem associated with the possibility that dirty fluid can reach the discharge opening 120 is, that in principle that fluid is able to squeeze between the end cap assembly 27 and the intermediate coupling member 204 (out-to-in flow as shown in FIG. 8, but the same is true for the in-to-out flow configuration). Hence, a seal is provided between the end cap assembly 27 and the intermediate coupling member 204.

In the example of FIG. 8 such a seal comprises an annular groove 222 in which an O-ring 223 is housed. The annular groove 222 is provided on an inner surface of the end cap assembly 27. The annular groove 222 with the O-ring 223 seals against a peripheral rim or sealing surface 224 provided on an outer surface of the intermediate coupling member 204. The peripheral rim or sealing surface 224 is also inclined with respect to the longitudinal axis H-H and the inclination of the annular groove 222 and the peripheral rim 224 correspond. One advantage of providing both the annular groove 222 and the peripheral rim or sealing surface 224 with the shown and the same inclination is, that when the filter element is placed in the housing 23 a smooth lead-in to create the O-ring seal is guaranteed. Another advantage is that it is not possible to use wrong filter elements in the filter assembly according to the invention. Such wrong filter elements will not have the proper inclined annular groove 222 and consequently as such wrong filter elements will not provide a proper seal and contaminated fluid will be able to flow from the contaminant-loaded side of the filter element towards the contaminant-free side of the filter element.

It is noted here that the arrangement of the inclined annular groove 222 comprising the O-ring 223 is not limited to the combination with an inclined guide surface 208. The inclined annular groove 222 requires the presence of a correspondingly inclined peripheral rim 224 on the intermediate coupling member 204 to make sure that only dedicated filter elements comprising an end cap assembly that is provide with the inclined annular groove can be used in the filter assembly according to the invention. As explained earlier, the reason for not allowing non-dedicated filter elements is necessary to avoid possible problems with the performance of the filter assembly.

Figure 9:
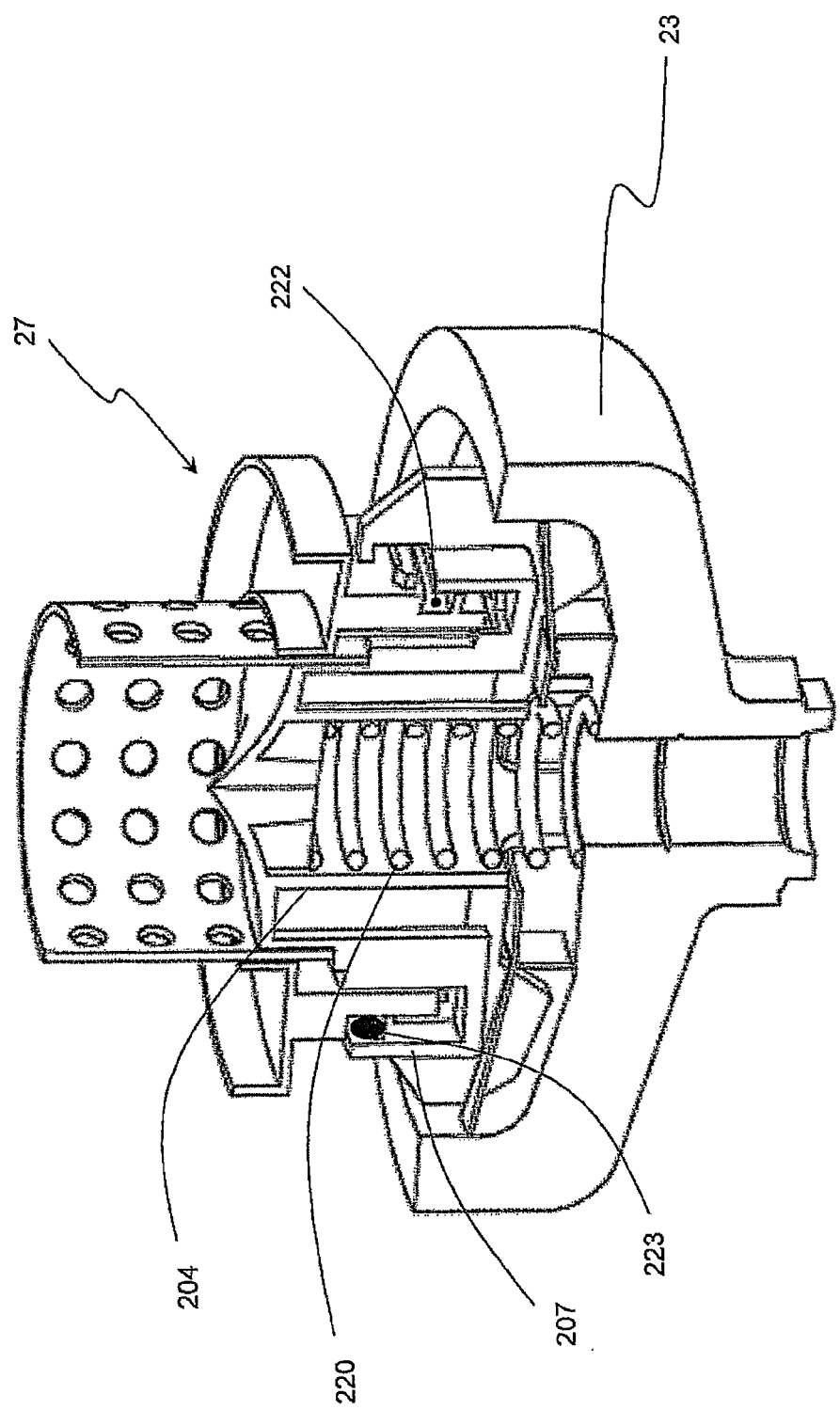
FIG. 9 schematically depicts in sectional view a part of the filter housing with the lockring, coupling member and end cap assembly mounted in an alternative embodiment.

In an alternative embodiment shown in FIG. 9, the inclined annular groove 222 comprising the O-ring 223 is provided on an outer surface of the end cap assembly 27 and seals against a correspondingly inclined inner surface of the peripheral wall 207. The co-operation between the projection 210 and the slot 209 ensures that the filter element and thus the seal member in the form of the O-ring 223 is properly positioned with respect to the sealing surface 224.

It is noted that the advantages of the sealing arrangement with the inclined annular groove 222 and the inclined sealing surface provided by the peripheral rim 224 are also achieved independent from the other features of the inventive filter assembly as described. Hence, the inclined sealing arrangement can also advantageously be used separately.

Figure 10:
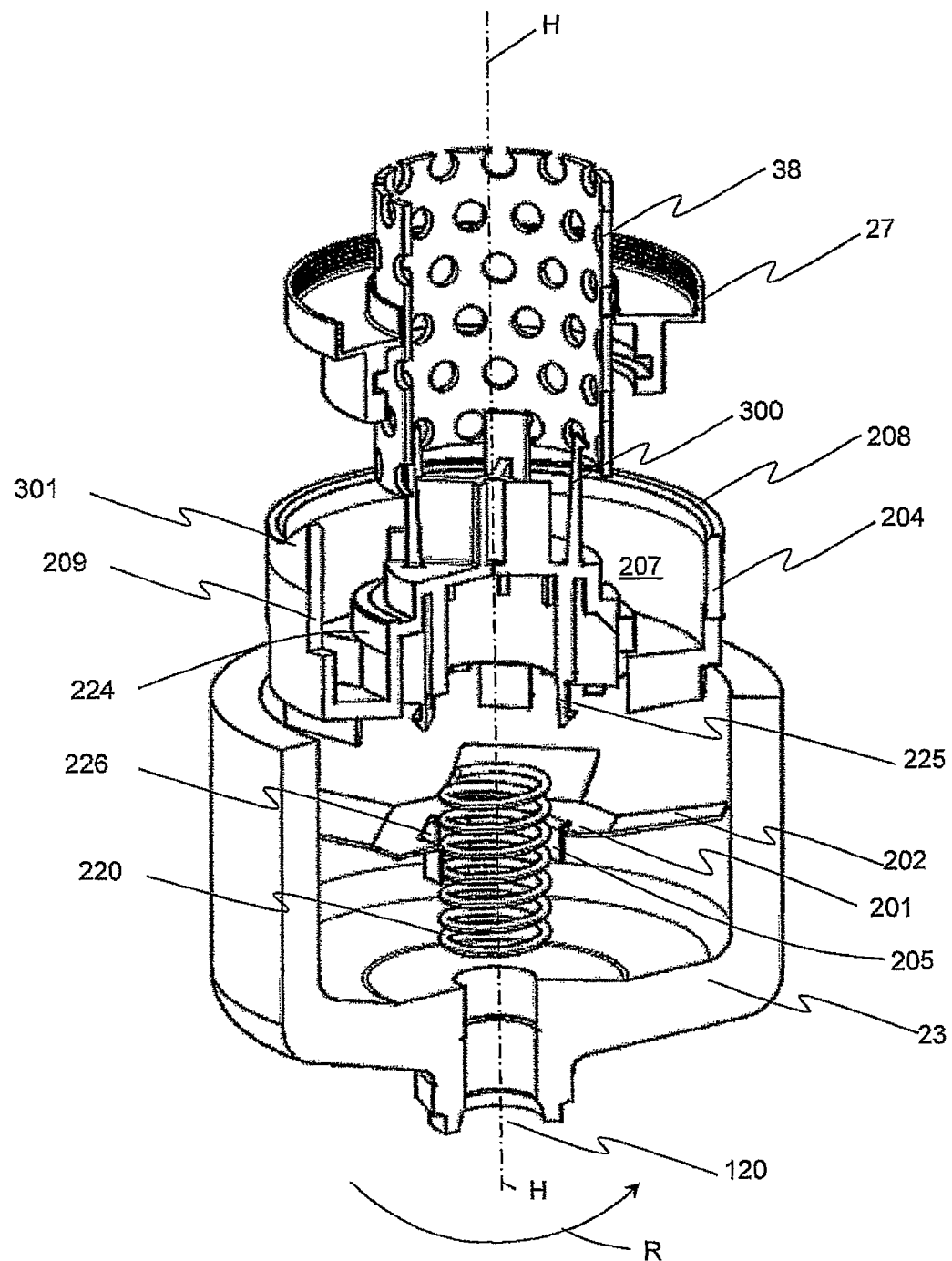
FIG. 10 depicts a sectional view of part of a filter assembly in an exploded view.

A further alternative embodiment of a filter assembly according to one or more aspects of the present invention is depicted in FIG. 10. The embodiment of the filter assembly of FIG. 10 is similar to the embodiment as shown in FIG. 6, except for the following differences.

As in FIG. 6, FIG. 10 depict an exploded and partly cut-away view of the lower section of the filter assembly, showing the filter housing 23 with the discharge opening 120. In the filter housing 23 the coupling member 201 can be seen, which is of a simpler design than the coupling member as shown in FIG. 2. The coupling member 201 again comprises the radially extending resilient members 202 that contact (engage) the inner surface of the filter housing 23, and also comprises the support legs 205. Further, coupling openings 226 are provided which can couple with coupling fingers 225 provided on the intermediate coupling member 204. Operable between the intermediate coupling member 204 and the coupling member 201 is a compression spring 220 which urges the intermediate coupling member 204 upwards and pulls the coupling fingers 225 against the coupling member 201. The compression spring is mainly arranged to reduce play. The provision of the compression spring 220 is not essential.

As the coupling ring or leaf spring 201 is prevented from being pulled out of the filter housing 23 as described above, the intermediate coupling member 204 is fixed inside the filter housing 23 and removal is prevented. The intermediate coupling member 204 comprises the slot 209 that is designed to accommodate the projection 210 that is part of the second end cap assembly 27. When the filter element is put into the filter housing 23, the filter element and as such the second end cap assembly 27 will have an arbitrary rotational position with respect to the intermediate coupling member 204.

At this moment, and which is different from the embodiment of FIG. 6, the filter element does not need any further manual manipulation. The person performing the maintenance will after having put the filter element in the filter housing 23 need to attach the filter housing 23 to the filter head 22. This is done by rotating the filter housing in a clockwise manner (depending on the type of threading used this may also be counterclockwise). As the filter housing 23 is rotated as indicated with arrow R in FIG. 10, the filter element 21 will abut with its upper or first end cap 26 against an inner annular wall 52 of the filter head 22 (see FIG. 5A). As the filter housing 23 is rotated further, the filter element 21 will experience an increased friction between the first end cap assembly 26 and the inner annular wall 52. As the second end cap assembly 27 and the intermediate coupling member 204 are, preferably, made of plastic the friction between the guide surface 208 and the projection 210 is less than the friction between the annular wall 52 and the first end cap assembly 26. The effect is that the projection 210 will travel along the guide surface 208, more specifically the guide surface 208 will travel underneath the projection 210, until it reaches the slot 209. The guide surface 208 may be provided with a raised portion 301 which prevents the projection 210 to overshoot the recess 209. This feature is however not essential. Further rotation of the filter housing 23 will urge the projection 210 deeper into the slot 209, i.e. in an axial direction.

Again, the filter element will be properly aligned with respect to the intermediate coupling member 204, thus ensuring proper alignment of the inclined seal arrangement.

In the embodiment of FIG. 10, the intermediate coupling member 204 comprises a number of coupling hooks 300 that extend in an upward direction in the FIG. 10 and which are arranged to attach to a coupling rim that is provided on the inner surface of the core element 38 (not shown in FIG. 10).

Figure 11:
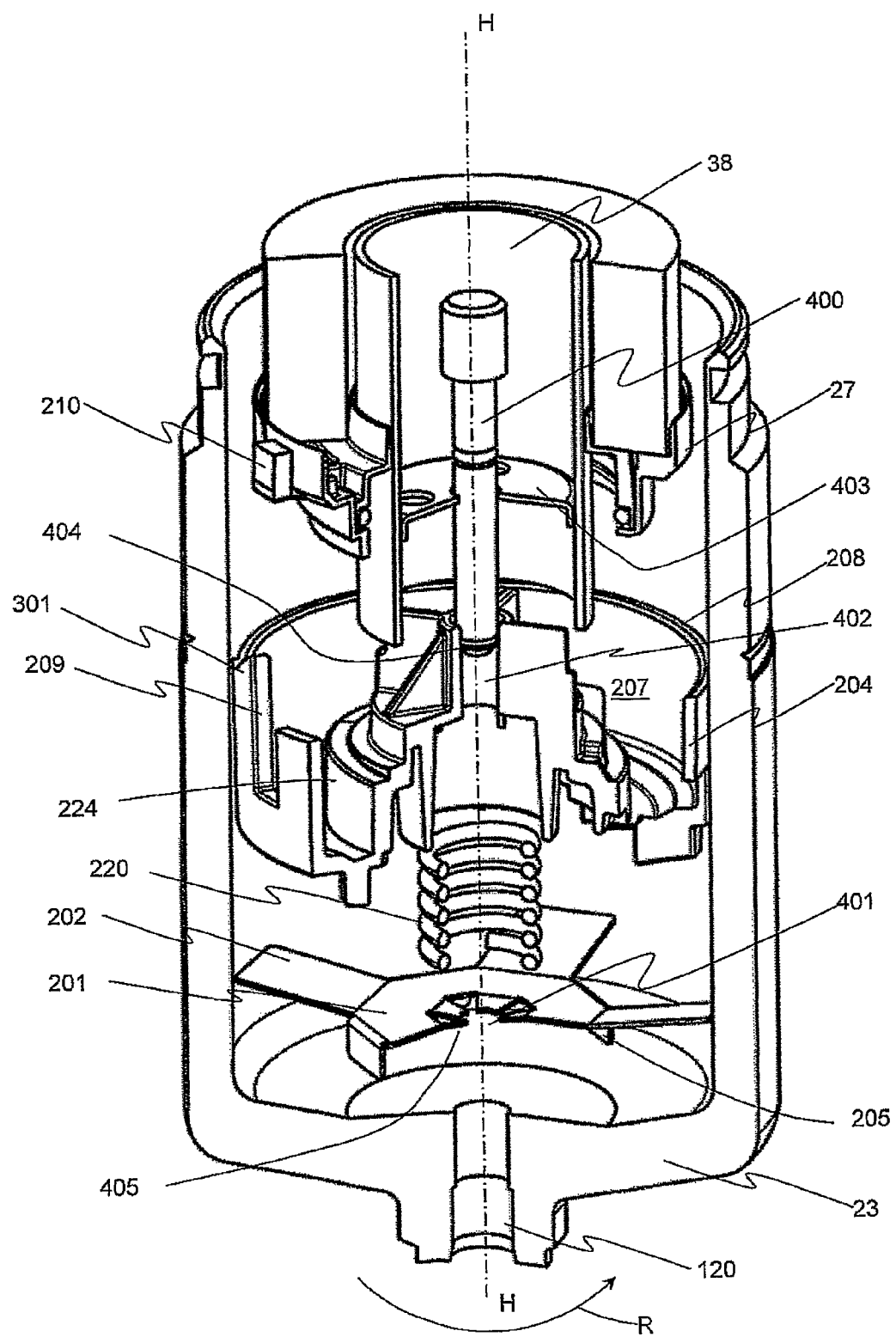
FIG. 11 depicts a sectional view of part of a further filter assembly in an exploded view.

A further alternative embodiment of a filter assembly according to one or more aspects of the present invention is depicted in FIG. 11 in an exploded view. The embodiment of the filter assembly of FIG. 11 is the same as the embodiment shown in FIG. 10, apart from the way in which the core element 38 is connected to the coupling member 201.

In the embodiment of FIG. 11 the core element 38 is connected to the coupling member 201 by means of a coupling pen 400 that is supported by a plate 403 that is provided with a through hole for the coupling pen 400 to pass through. The plate 403 is attached to the inner surface of the core element 38, for example by means of welding or any other suitable way. The coupling pen 400 extends through an annular bore 402 provided in the intermediate coupling member 204 and in a coupled state extends with its distal end 404 into a circular opening 401 in the coupling member 201. The circular opening 401 is provided with a number of resilient coupling fingers 405 that grip the distal end 404 of the coupling pen 400. Preferably the distal end 404 is provided with a circular groove into which the coupling fingers 405 can be, at least partly, housed. The coupling fingers 405 are angled in a downward direction in FIG. 11 and operate in a manner similar to the resilient elements 202 of the coupling member 201.

It is to be understood, that the interaction between the intermediate coupling member 204 and the end cap assembly 27 is not limited to the examples shown. In particular, arrangements not comprising the inclined guide surface 208 can also be used. However, the use of an inclined guide surface is advantageous, as this will always ensure a correct (radial) positioning of the end cap assembly 27 with respect to the intermediate coupling member 204, which in turn ensures proper working of the seal between the end cap assembly 27 and the intermediate coupling member 204, i.e. ensures that the inclined sealing arrangement is properly aligned. However, other solutions that achieve a proper positioning of the end cap assembly 27, and thus the filter element, and the intermediate coupling member 204 are possible, such as a bayonet locking or the use of threading.

It is noted here that the advantages of the coupling member 201 or leaf spring as described herein are also achieved independent from the other features of the inventive filter assembly as described. In particular the coupling member or leaf spring 201 may for example be used with a filter element that is not provided with a bypass flow valve as discussed, or may be used together with a sealing arrangement between the filter element and the intermediate coupling member that does not have inclined sealing surfaces. In particular the coupling member 201 may be used to establish an easy way of coupling the filter element to the filter housing or to establish a direct coupling between the core element and the filter housing.

It is noted that the above invention is not limited to the above-described examples of filter assemblies. In particular it is noted that the invention is also applicable to filter assemblies which are used for filtering gaseous media in which particles are entrained. In such applications it is also relevant that when the filter element needs to be exchanged, that flow of the gaseous media is prohibited when separating the filter housing from the filter head. Furthermore, easy separation of the filter element from the filter head is also relevant for gaseous media, as the filter may be contaminated with particles that are for example greasy. However, other reasons why the filter element should be removed from the filter head together with the filter housing are equally applicable.

It is further noted that the filter housing, filter element or other elements of the filter assembly that have been described as having a circular or tubular cross-section, do not necessarily have to be circular or tubular. Any other convenient and suitable cross-section can be used, such as for example a non-circular filter element or non-circular filter housing.

A first alternative way of defining the present invention is provided in the following consecutively numbered clauses:

1. A filter assembly comprising:
    a filter element,
    a filter housing for accommodating the filter element,
    an end cap assembly at a first end of said filter element, the end cap comprising a tubular portion open at its axial ends and forming with the filter element a first fluid flow passage,
    a filter head removably attachable to said filter housing and comprising an inlet port, an outlet port and an annular passage in fluid communication with the outlet port, the annular passage forming with the tubular portion a second fluid flow passage, characterized by
    a valve assembly provided in the filter head and operable between the annular passage and the outlet port, the valve assembly comprising a valve that is axially movable within the valve assembly between a first position allowing fluid to flow through the annular passage and a second position blocking flow through the annular passage.
2. Filter assembly according to clause 1, wherein the tubular portion comprises an annular wall having a radial flow passage for allowing fluid to bypass the filter element, and a bypass flow valve axially movable within the tubular portion between a first position blocking flow through the radial flow passage and a second position allowing flow through the radial flow passage.
3. Filter assembly according to clause 1 or 2, wherein the valve assembly comprises a valve housing which supports an axially extending tubular guide member for telescopic movement of a stem of the valve therein, said tubular guide member being open at a distal end thereof and comprising flow means to allow fluid to enter and leave the tubular guide member.
4. Filter assembly according to clause 3, wherein the valve is spring-loaded so as to bias the valve towards its second position.
5. Filter assembly according to clause 2, wherein the valve comprises a first valve element and a second valve element, the first and second valve element being axially movable with respect to each other, the first valve element being open toward the second valve element, wherein the second valve element is movable between a first position abutting the first valve element so as to form a unitary valve, and a second position axially distanced from the first valve element and sealing against the tubular wall portion, blocking flow through the first fluid flow passage.
6. Filter assembly according to clause 5, wherein the first valve element supports an axially extending tubular guide member for telescopic movement of a stem of the second valve element therein.
7. Filter assembly according to claim 5 or 6, wherein the second valve element is spring-loaded so as to bias the second valve element towards its first position.
8. Filter assembly according to any of the clauses 2-7, further comprising a resilient member for biasing the bypass flow valve in its first position.
9. Filter assembly according to clause 8, further comprising a further end cap assembly at an opposite end of said filter element, a perforated core element extending substantially between said end caps in an interior of the filter element, said core element supporting the resilient member.
10. Filter assembly according to clause 8, wherein the resilient member is mounted in the filter head.
11. Filter assembly according to any of clauses 8-10, wherein the resilient member is a spring, in particular a compression spring.
12. Filter assembly, comprising
    a filter element,
    a filter housing for accommodating the filter element,
    an end cap assembly at a first end of said filter element, the end cap comprising a tubular portion open at its axial ends and forming with the filter element a first fluid flow passage,
        a filter head removably attachable to said filter housing and comprising an inlet port, an outlet port and an annular passage in fluid communication with the outlet port, the annular passage forming with the tubular portion a second fluid flow passage, preferably according to any of the previous clauses further comprising a coupling assembly provided in the filter housing for detachably coupling the core element to the filter housing.
13. Filter assembly according to clause 12, wherein the coupling assembly comprises grip members to grip the end cap assembly and/or the core element.
14. Filter assembly according to clause 12 or 13, wherein the coupling assembly comprises a leaf spring, in particular a resilient lock ring, having a peripheral edge that is arranged to grip an inner surface of the filter housing.
15. Filter assembly according to clause 14, wherein the leaf spring has a number of radially extending resilient elements contacting the inner surface of the filter housing and allowing a resilient deformation upon insertion of the leaf spring into the filter housing.
16. Filter assembly according to any of clauses 12 to 15, wherein the coupling assembly comprises a number of support legs for supporting the coupling assembly from a bottom part of the filter housing.
17. Filter assembly according to any of the clauses 12 to 16, wherein the coupling assembly comprises an intermediate coupling member for coupling with the leaf spring and detachably coupling with the further end cap and/or the core element.
18. Filter assembly according to clause 17, wherein the intermediate coupling member has a peripheral wall portion which extends in a longitudinal direction of the filter housing, said wall portion having an inclined guide surface with respect to the longitudinal direction.
19. Filter assembly according to clause 18, wherein the wall portion further comprises a recess in that part thereof that is closest to the coupling member, and which is adapted to co-operate with a notch provided on the further end cap assembly.
20. Filter assembly according to any of clauses 12 to 19, wherein the end cap assembly comprises an annular groove for accommodating a seal member for sealing against the coupling assembly.
21. Filter assembly according to clause 20, wherein said annular groove is inclined with respect to the longitudinal direction.
22. Filter assembly according to any of clauses 17 to 21, wherein the end cap assembly comprises an annular groove for accommodating a seal member for sealing against the intermediate coupling member.
23. Filter assembly according to clause 22, wherein the intermediate coupling member comprises an inclined peripheral rim against which the seal member seals.

A second alternative way of defining the present invention is provided in the following consecutively numbered clauses:
1. A filter assembly (20) comprising:
    a filter housing (23);
    a filter element (21) arranged in said filter housing (23);
    a filter head (22) attachable to said filter housing (23), the filter head (22) comprising:
        an inlet port (44) in fluid communication with a first side of the filter element (21);
        an outlet port (45) in fluid communication with a second side of the filter element (21), and
    a core element (38) extending within the filter housing (23) and substantially covering the second side of the filter element (21),
    characterized in that
    the filter assembly (20) further comprises a coupling assembly (200) that is insertable in the filter housing (23), the coupling assembly (20)) comprising a leaf spring (201) having an outer edge which has a larger span than an internal diameter of the filter housing (23), such that when the leaf spring (201) is inserted into the filter housing (23) the outer edge thereof engages an inner surface of the filter housing (23) and flexes in a direction opposite to a direction of insertion of the leaf spring (201), preventing removal of the leaf spring (201) from the filter housing (23), the coupling assembly (200) further comprising a connecting part (213, 225, 400) for connecting the core element (38) to the coupling assembly (200).
2. Filter assembly according to clause 1, wherein the leaf spring (201) has a number of radially extending resilient elements (202) which engage the inner surface of the filter housing (23).
3. Filter assembly according to clause 1 or 2, wherein the coupling assembly (200) comprises a number of support legs (205) for supporting the coupling assembly (200) from a bottom part of the filter housing (23).

4. Filter assembly according to any of the previous clauses, wherein the coupling assembly (200) further comprises an intermediate coupling member (204) that is connected to the leaf spring (201) and comprises the connecting part (213, 225, 400) for connecting the core element (38) to the coupling assembly (200).

5. Filter assembly according to clause 4, wherein the filter element (21) comprises an end cap assembly (27) at a distal end thereof that is closest to the coupling assembly (200), said end cap assembly (27) comprising a projection (210) which is accommodated in a slot (209) provided in a peripheral wall (207) of the intermediate coupling member (204), said wall (207) extending in a longitudinal direction (H-H) of the filter housing (23) away from the leaf spring (201), wherein the end cap assembly (27) comprises a circumferential groove (222) for accommodating a seal member (223) and the intermediate coupling member (204) comprises a circumferential sealing surface (224) for sealing against the seal member (223), and wherein said groove (222) and said sealing surface (224) have a corresponding inclination with respect to the longitudinal direction (H-H) of the filter housing (23).

6. A filter assembly (20) comprising:
a filter housing (23);
a filter element (21) arranged in said filter housing (23),
a filter head (22) attachable to said filter housing (23), the filter head (22) comprising:
an inlet port (44) in fluid communication with a first side of the filter element (21);
an outlet port (45) in fluid communication with a second side of the filter element (21), and
a flow channel providing a flow path between the second side of the filter element (21) and the outlet port (45),
characterized in that
the filter head (22) further comprises a valve assembly (100) that is arranged in said flow path between the second side of the filter element (21) and the outlet port (45), the valve assembly (100) comprising a valve member (105, 107) that is operable between an open position allowing flow along said flow path and a closed position blocking flow along said flow path, the valve assembly (100) comprising a spring (108) that exerts a force on said valve member (105, 107) which urges the valve member (105, 107) in said closed position thereof when a pressure difference between a first side of the valve assembly (100) that is open towards the filter element (21) and a second side of the valve assembly (100) that is open towards the outlet port (45) is below a predetermined threshold.

7. Filter assembly according to clause 6, wherein the valve assembly (100) comprises a valve member housing (101) which supports a guide member (103) for telescopic movement of a stem (104) of the valve member (105, 107) therein, said guide member (130) being open at a distal end thereof and comprising flow means (119) to allow fluid to enter and exit the guide member (103).

8. Filter assembly according to clause 6 or 7, wherein the filter element (21) comprises an end cap (26) that is open towards the flow channel, the end cap (26) comprising a radial flow passage (34) for allowing fluid to bypass the filter element (21) and a bypass flow valve (35) movable between a closed position blocking flow through the radial flow passage (34) and an open position allowing flow through the radial flow passage (34).

9. Filter assembly according to clause 8, wherein the bypass flow valve (35) is a tubular member open at its distal ends.

10. Filter assembly according to clause 8 or 9, wherein the bypass flow valve (35) is moveable in an axial direction (H-H) of the filter element (21).

11. Filter assembly according to any of clauses 8 to 10, further comprising a resilient member (37) that exerts a force on the bypass flow valve (35), wherein said resilient member (37) urges the bypass flow valve (35) into said closed position when a pressure difference between the first side of the filter element (21) and the second side of the filter element (21) is below a predetermined threshold.

12. Filter assembly according to clause 11, further comprising a core element (38) extending within the filter housing (23) and substantially covering the second side of the filter element (21), said core element (38) supporting the resilient member (37).

13. Filter assembly according to clause 11, wherein the resilient member (37) is mounted in the filter head (22).

14. Filter assembly according to clause 11, 12 or 13 wherein the resilient member (37) is a spring, in particular a compression spring.

15. Filter assembly according to any of the clauses 8 to 14, wherein the valve member (105, 107) comprises a first valve element (105) and a second valve element (107), wherein, the first valve element (105) has at least one flow opening open towards the second valve element (107), the second valve element (107) is movable with respect to the first valve element (105) between a first position abutting the first valve element (105), and a second position distanced from the first valve element (105), when the first valve element (107) is in a position that corresponds to the closed position of the valve member (105, 107), in which second position the second valve element (107) urges the bypass flow valve (35) in its open position while closing the flow path towards the second side of the filter element and allowing flow from the outlet port (45) through the flow opening of the first element (105) towards the inlet port (44) via the radial flow passage (34), and
wherein the valve assembly (100) comprises a further spring (111) operable between the first valve element (105) and the second valve element (107) and which urges the second valve element (107) in said first position thereof when a pressure difference between said second side of the valve assembly (100), that is open towards the outlet port (45), and said first side of the valve assembly (100), that is open towards the filter element (21), is below a predetermined threshold.

16. Filter assembly according to clause 15, wherein the first valve element (105) supports a further guide member (104) for telescopic movement of a stem (106) of the second valve element (107) therein.

The invention claimed is:
1. A filter assembly comprising:
a filter housing into which a filter element is insertable;
a filter head attachable to said filter housing, the filter head comprising:
an inlet port in fluid communication with a first side of the filter element; and
an outlet port in fluid communication with a second side of the filter element;
a core element extending within the filter housing and covering the second side of the filter element; and
a leaf spring that is insertable into the filter housing;
wherein the filter assembly further comprises a coupling assembly for coupling the core element to the filter housing, wherein the coupling assembly is insertable into the filter housing, the coupling assembly comprising said leaf spring and a connecting part for connecting the core element to the coupling assembly; and wherein the leaf spring, prior to insertion, has a span larger than an internal diameter of the filter housing, such that when the leaf spring is inserted into the filter housing an outer edge of the leaf spring engages an inner surface of the filter housing and the leaf spring resiliently deforms to bulge in the direction of insertion of the leaf spring into the filter housing, thereby preventing removal of the leaf spring, in a direction opposite to the direction of insertion of the leaf spring, from the filter housing due to urging the outer edge of the leaf spring against the inner surface of the filter housing.

2. The filter assembly according to claim 1, wherein the leaf spring has a plurality of radially extending resilient elements having free outer edges which engage the inner surface of the filter housing, when the coupling assembly is inserted in the filter housing.

3. The filter assembly according to claim 1, wherein the coupling assembly comprises a plurality of support legs for supporting the coupling assembly at a distance from a bottom part of the filter housing.

4. The filter assembly according to claim 1,
wherein the filter element comprises an end cap assembly at an end thereof that is closest to the coupling assembly, said end cap assembly comprising a projection which is accommodated in a slot provided in a peripheral wall of an intermediate coupling member, said peripheral wall extending in a longitudinal direction of the filter housing away from the leaf spring,
wherein the end cap assembly comprises a circumferential groove for accommodating a seal member and the intermediate coupling member comprises a circumferential sealing surface for sealing against the seal member, and
wherein said circumferential groove and said circumferential sealing surface have a corresponding inclination with respect to the longitudinal direction of the filter housing.

5. The filter assembly according to claim 1, wherein the filter head further comprises a valve assembly arranged in the outlet port, the valve assembly being movable in an axial direction between a first valve assembly position allowing flow through said outlet port and a second valve assembly position blocking flow through said outlet port.

6. The filter assembly according to claim 5, wherein the valve assembly comprises a first spring member biased for moving the valve assembly towards the second valve assembly position.

7. The filter assembly according to claim 5, wherein, in the second valve assembly position, the valve assembly seals against a valve seat provided in the filter head.

8. The filter assembly according to claim 6,
wherein the valve assembly comprises a first valve element and a second valve element,
wherein the first valve element is tubular and open at both axial ends of the first valve element,
wherein the first and second valve elements are moveable with respect to each other in said axial direction between a valve elements first position and a valve elements second position,
wherein, in the valve elements first position, the second valve element seals against the first valve element to block flow through said first valve element, and
wherein, in the valve elements second position, the second valve element and first valve element are axially spaced to define a radial gap allowing flow through said first valve element and through the radial gap.

9. The filter assembly according to claim 8, wherein the valve assembly comprises a second spring member biased for moving the first and second valve elements towards the valve elements first position.

10. The filter assembly according to claim 9, wherein the bias force of the second spring member is larger than the bias force of the first spring member.

11. The filter assembly according to claim 9, wherein the first valve element comprises a first stem and the second valve element comprises a second stem, and wherein the first stem telescopically guides the second stem.

12. The filter assembly according to claim 11, wherein the second spring member is arranged between the first and second stem.

13. The filter assembly according to claim 1, further comprising a filter element.

14. The filter assembly according to claim 5,
wherein the valve assembly comprises a first valve element and a second valve element,
wherein the first valve element is tubular and open at both axial ends of the first valve element,
wherein the first and second valve elements are moveable with respect to each other in said axial direction between a valve elements first position and a valve elements second position,
wherein, in the valve elements first position, the second valve element seals against the first valve element to block flow through said first valve element, and
wherein, in the valve elements second position, the second valve element and first valve element are axially spaced to define a radial gap allowing flow through said first valve element and through the radial gap.

* * * * *